(12) United States Patent
McDaniel et al.

(10) Patent No.: US 7,589,044 B2
(45) Date of Patent: Sep. 15, 2009

(54) METHODS OF PREPARING A POLYMERIZATION CATALYST

(75) Inventors: Max P. McDaniel, Bartlesville, OK (US); Kathy S. Collins, Bartlesville, OK (US); Elizabeth A. Benham, Spring, TX (US); William B. Beaulieu, Tulsa, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 181 days.

(21) Appl. No.: 11/866,083

(22) Filed: Oct. 2, 2007

(65) Prior Publication Data

US 2009/0088318 A1    Apr. 2, 2009

(51) Int. Cl.
- *B01J 21/00* (2006.01)
- *B01J 21/02* (2006.01)
- *B01J 21/04* (2006.01)
- *B01J 21/06* (2006.01)
- *B01J 21/08* (2006.01)
- *B01J 21/12* (2006.01)
- *B01J 23/00* (2006.01)
- *B01J 23/26* (2006.01)

(52) U.S. Cl. .................. 502/256; 502/240; 502/254; 502/305; 502/308; 502/309; 502/319; 502/320; 502/323

(58) Field of Classification Search ............ 502/240, 502/242, 256, 305, 308, 319, 320, 323
See application file for complete search history.

(56) References Cited

U.S. PATENT DOCUMENTS

| | | | |
|---|---|---|---|
| 3,248,179 A | 4/1966 | Norwood | |
| 3,362,946 A | 1/1968 | Hogan | |
| 3,446,754 A | 5/1969 | Solvik et al. | |
| 3,976,632 A | 8/1976 | Delap | |
| 4,022,580 A | 5/1977 | Rush | |
| 4,041,224 A | 8/1977 | Hoff et al. | |
| 4,151,122 A | 4/1979 | McDaniel et al. | |
| 4,296,001 A | 10/1981 | Hawley | |

(Continued)

FOREIGN PATENT DOCUMENTS

| EP | 0055864 A2 | 7/1982 |
|---|---|---|
| EP | 0857737 A1 | 8/1998 |
| EP | 0882740 A1 | 12/1998 |
| WO | 0068279 A1 | 11/2000 |

OTHER PUBLICATIONS

Foreign communication from a related counterpart appplication—Invitation to Pay Additional Fees, PCT/US2007/080329, Jun. 16, 2008, 6 pages.

(Continued)

*Primary Examiner*—Timothy C Vanoy
*Assistant Examiner*—Serena L Hanor
(74) *Attorney, Agent, or Firm*—Conley Rose, P.C.; Rodney B. Carroll; Cheryl L. Huseman

(57) ABSTRACT

A method comprising contacting a donor support with a recipient support to generate a mixture, and heating the mixture to produce a polymerization catalyst, wherein a metal or a metal-containing compound migrates from the donor support to the recipient support. A method comprising contacting a donor support comprising inactive metal species with a recipient support, and mobilizing the inactive metal species from the donor support to form an active metal species on the recipient support.

23 Claims, 19 Drawing Sheets

U.S. PATENT DOCUMENTS

| | | | |
|---|---|---|---|
| 4,310,440 | A | 1/1982 | Wilson et al. |
| 4,397,769 | A | 8/1983 | McDaniel et al. |
| 4,501,885 | A | 2/1985 | Sherk et al. |
| 4,588,790 | A | 5/1986 | Jenkins, III et al. |
| 5,006,506 | A | 4/1991 | Hsieh et al. |
| 5,200,478 | A | 4/1993 | Vogels et al. |
| 5,352,749 | A | 10/1994 | DeChellis et al. |
| 5,436,304 | A | 7/1995 | Griffin et al. |
| 5,455,314 | A | 10/1995 | Burns et al. |
| 3,281,405 | A | 10/1996 | Hogan |
| 5,565,175 | A | 10/1996 | Hottovy et al. |
| 5,575,979 | A | 11/1996 | Hanson |
| 6,239,235 | B1 | 5/2001 | Hottovy et al. |
| 6,262,191 | B1 | 7/2001 | Hottovy et al. |
| 6,359,085 | B1 | 3/2002 | Lhost et al. |
| 6,518,375 | B1 * | 2/2003 | Monoi et al. ............... 526/104 |
| 6,833,415 | B2 | 12/2004 | Kendrick et al. |
| 7,223,823 | B2 | 5/2007 | Lin |
| 7,271,122 | B2 | 9/2007 | Bodart et al. |
| 7,348,384 | B2 | 3/2008 | Schneider et al. |
| 7,384,885 | B2 * | 6/2008 | Roger et al. ............... 502/113 |

OTHER PUBLICATIONS

Foreign communication from a related counterpart application—International Search Report and Written Opinion, PCT/US2007/080329, Oct. 21, 2008, 19 pages.

Jozwiak, Wojciech, et al., "Interactions between the chromium oxide phase and support surface; redispersion of α-chromia on silica, alumina and magnesia," Journal of the Chemical Society, Great Britain, 1997, No. 15, pp. 2583-2589.

McDaniel, Max, et al., "New developments in chrome catalyst technology for the loop slurry process," Oct. 2006, 5 pages, Chevron Phillips Chemical Company, LP.

* cited by examiner

METHODS OF PREPARING A POLYMERIZATION CATALYST

FIELD

The present disclosure relates to catalyst compositions. More specifically, the present disclosure relates to methods of preparing polymerization catalyst compositions comprising a support and one or more metals.

BACKGROUND

Polymerization catalysts are known in the art, however methods of producing these catalysts may suffer from a variety of drawbacks. Enhancements in preparation methods for polymerization catalysts can reduce the costs associated with catalyst production and improve process economics. Thus, there is an ongoing need to develop new methods of preparing polymerization catalysts.

SUMMARY

Disclosed herein is a method comprising contacting a donor support with a recipient support to generate a mixture, and heating the mixture to produce a polymerization catalyst, wherein a metal or a metal-containing compound migrates from the donor support to the recipient support. The donor support, the recipient support, or both may comprise silica, alumina, silica-titania, aluminophosphate, zirconia, titania, or combinations thereof. The donor support and the recipient support may comprise silica.

The donor support may be formed via contact with a chromium-containing compound. The donor support may have not been heated to equal to or greater than 200° C. prior to contact with the recipient support. The donor support may have been heated to equal to or greater than 200° C. prior to contact with the recipient support. The donor support may have a surface area in the range of from about 10 m²/g to about 1000 m²/g. The donor support comprises equal to or greater than 50% silica.

The chromium-containing compound may be a water-soluble compound. The chromium-containing compound may be a hydrocarbon-soluble compound. The donor support may comprise from about 0.0001% to about 15% chromium by final weight of the donor support.

The recipient support may not contain an effective amount of a polymerization catalytic compound. The recipient support may have not been heated to equal to or greater than 200° C. prior to contact with the recipient support. The recipient support may contain a partial amount of a polymerization active compound than an otherwise similar recipient support containing fully saturated amount of the polymerization active compound. The recipient support may have a surface area in a range of from about 10 m²/g to about 1000 m²/g. The recipient support may be a virgin support.

The donor support and recipient support may be contacted at a ratio of from about 1:1. The contacting may occur via dry mixing of the donor support and the recipient support. The contacting may occur in a fixed bed or fluidized bed. The heating of the mixture may be in a range of from about 400° C. to about 1000° C.

Disclosed herein is a method comprising contacting a donor support comprising inactive metal species with a recipient support, and mobilizing the inactive metal species from the donor support to form an active metal species on the recipient support. The donor support and the recipient support may comprise silica. The inactive metal species may be Cr(III) and the active metal species may be Cr(VI).

DETAILED DESCRIPTION

Figure 1:
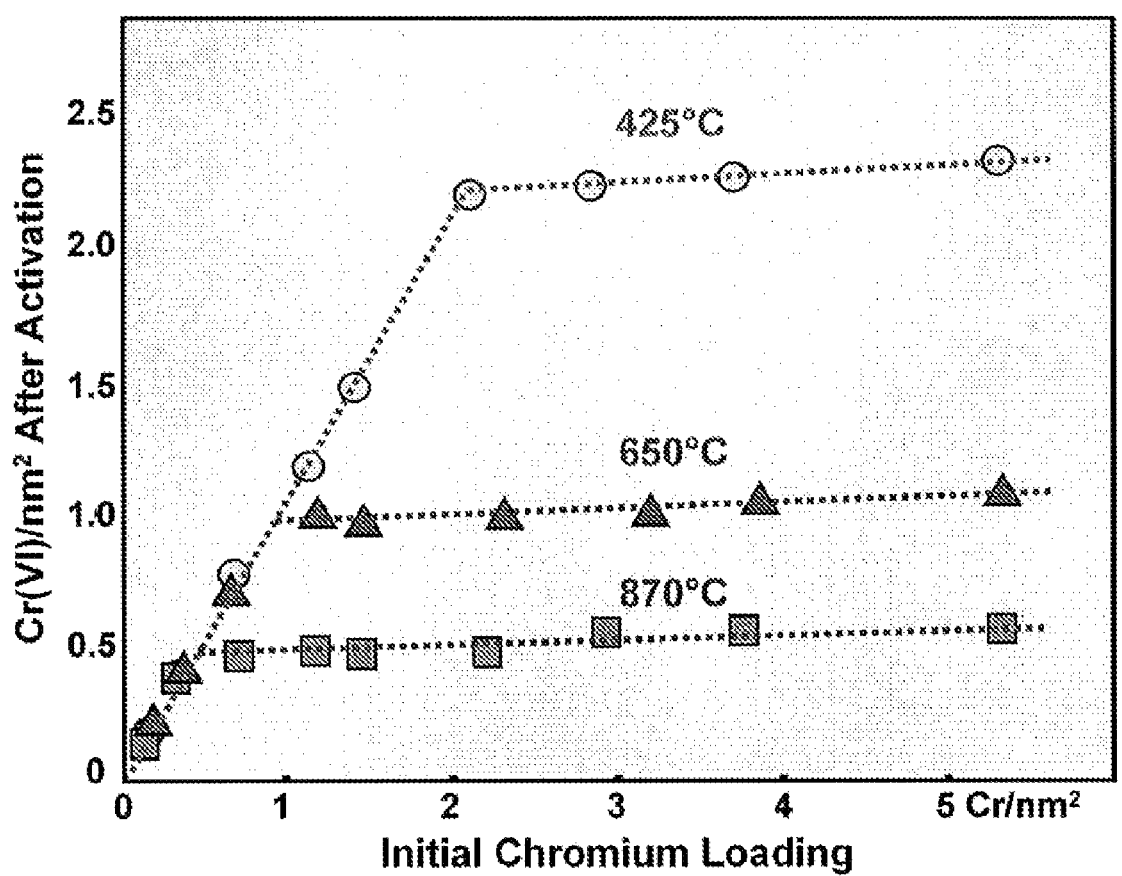
FIG. 1 is a plot of the amount of Cr(VI) remaining after activation as a function of initial chromium loading for the samples from Example 1.

Disclosed herein are methods of preparing a catalyst comprising contacting a donor support with a recipient support to generate a mixture; and heating the mixture to produce a polymerization catalyst, wherein a metal or a metal-containing compound migrates from the donor support to the recipient support. The donor support may be formed by contacting one or more metals (e.g., chromium) or metal-containing compounds with a base support (e.g., silica). The recipient support (e.g., silica) may be the same support material or a different support material that the base support material of the donor support. The donor support may comprise metal species (e.g., active and/or inactive species) such that upon contact of the donor support with the recipient support, all or a portion of the metal species (e.g., active and/or inactive) are mobilized and transferred from the donor support to the recipient support, where such mobilized and transferred metal species may be active metal species. As a result, both the donor support and the recipient support may comprise an effective amount of one or more active metal species to catalyze one or more reactions. The various catalyst components and the methods of making the catalysts are described in more detail herein.

In embodiments, the donor support comprises one or more metals or metal-containing compounds and a base support (i.e., a metallized support). Such metals may be present in the donor support as active metal species, inactive metal species, or both. The metal may be added to the base support via any suitable means such as ion-exchange, incipient wetness, pore fill, aqueous impregnation, organic solvent impregnation, melt coating, dry mixing, or combinations thereof. In embodiments, the donor support comprises an amount of one or more metals effective to catalyze a polymerization reaction such as olefin polymerization. Examples of suitable metals include Group VI metals such as Cr, Mo, W, or combinations thereof. The base support may comprise one or more inorganic materials such as silica as described in more detail herein.

In an embodiment, the donor support comprises chromium and may be prepared by contacting a chromium-containing compound with a base support. The chromium-containing compound may be one or more compounds comprising chromium in the hexavalent oxidation state (hereinafter Cr(VI)) or comprising a material suitable for conversion to Cr(VI). In an embodiment, the chromium-containing compound comprises a water-soluble chromium compound; alternatively the chromium-containing compound comprises a hydrocarbon-soluble chromium compound. The chromium-containing compound may be a chromium (II) compound, chromium (III) compound, or combinations thereof. Suitable chromium (III) compounds include, but are not limited to, chromium carboxylates, chromium naphthenates, chromium halides, chromium pyrrolides, chromium benzoates, chromium dionates, chromium nitrates, chromium sulfates, or combinations thereof. Specific chromium (III) compounds include, but are not limited to, chromium (III) isooctanoate, chromium (III) 2,2,6,6-tetramethylheptanedionate, chromium (III) naphthenate, chromium (III) chloride, chromium (III) tris(2-ethylhexanoate), chromic fluoride, chromium (III) oxy-2-ethylhexanoate, chromium (III) dichloroethylhexanoate, chromium (III) acetylacetonate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, or combinations thereof. Suitable chromium (II) compounds include, but are not limited to, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, or combinations thereof. Examples of other suitable chromium-containing compounds include tertiary butyl chromate in a hydrocarbon liquid; chromium trioxide in water; chromium acetate in water; chromium nitrate in alcohol; zerovalent organochromium compounds such as pi bonded chromium complexes, for example, dicumene chromium and dibenzene chromium; or combinations thereof. Pi bonded chromium complexes are described in U.S. Pat. No. 3,976,632, which is incorporated by reference herein in its entirety.

The amount of chromium present in the donor support may range from about 0.1% to about 50% based on the final weight of the donor support, alternatively from about 0.5% to about 10%, or from about 1% to about 5%.

In various embodiments, the donor support comprises a base support. The base support may primarily include an inorganic oxide such as silica, alumina, silica-alumina, titania, silica-titania, alumina-titania, aluminophosphates, magnesia, zirconia, silica-zirconia, alumina-zirconia, ceria, ceria-zirconia, clay, zeolites, or combinations thereof. The base support may have a surface area and pore volume effective to provide for the production of an active donor support (e.g., polymerization catalyst). In an embodiment, the base support possesses a surface area in the range of from about 10 to about 1000 $m^2$/gram, a pore volume in the range of from about 0.1 to about 4.0 $cm^3$/gram and an average particle size in the range of from about 5 to about 500 µm. In another embodiment, the base support has a surface area in the range of from about 50 to about 500 $m^2$/gram, a pore volume of from about 0.5 to about 3.5 $cm^3$/gram, and an average particle size of from about 10 to about 200 µm. In yet another embodiment, the base support has a surface area in the range of from about 200 to about 400 $m^2$/gram, a pore volume from about 0.8 to about 3.0 $cm^3$/gram, and an average particle size of from about 25 to about 150 µm. In still another embodiment, the base support has a surface area in the range of from about 200 to about 450 $m^2$/gram, a pore volume in the range of from about 1 to about 2.5 $cm^3$/gram and an average particle size in the range of from about 40 to about 120 µm. In another embodiment, the base support has a surface area in the range of from about 250 to about 400 $m^2$/gram, a pore volume of from about 1.25 to about 2.5 $cm^3$/gram, and an average particle size of from about 40 to about 120 µm. In yet another embodiment, the base support has a surface area in the range of from about 250 to about 600 $m^2$/gram, a pore volume in the range of from about 1.5 to about 1.75 $cm^3$/gram, and an average particle size of from about 40 to about 120 µm. Generally, the average pore size of the base support ranges from about 10 to about 1000 Angstroms. In one embodiment, the average pore size of the base support is in the range of from about 50 to about 500 Angstroms, while in yet another embodiment the average pore size ranges from about 75 to about 350 Angstroms. The base support may be prepared using any technique known to one of ordinary skill in the art for the preparation of such materials.

In an embodiment, the base support comprises any of the oxides previously described herein. Such supports may be prepared using techniques known to one of ordinary skill in the art for the preparation of such materials. For example, the base support may comprise silica and the silica support may be made synthetically from sodium silicate. In an embodiment, the silica support may have a surface area ranging from about 100 $m^2$/g to about 1000 $m^2$/g and a pore volume ranging from about 0.5 cc/g to about 2.8 cc/g.

Alternatively, the base support comprises alumina. The alumina support may be made using known methods such as for example: reacting sodium aluminate, which is basic, with aluminum sulfate, which is acidic; neutralizing an aluminum salt with a base such as ammonia or ammonia hydroxide or sodium aluminate; performing flame hydrolysis of an aluminum compound; or performing hydrolysis of an organic solution of an aluminum compound by, e.g., adding water to an alcohol solution of aluminum isopropoxide ($Al(OC_3H_7)_3$). In an embodiment, the alumina support may have a surface area ranging from about 10 $m^2$/g to about 400 $m^2$/g and a pore volume ranging from about 0.1 cc/g to about 1.8 cc/g.

Alternatively, the base support comprises aluminophosphate. The aluminophosphate may be prepared by hydrothermal crystallization at elevated temperatures of aluminophosphate gels containing a molecular structure-forming template as described in U.S. Pat. No. 4,310,440 which is incorporated by reference herein in its entirety. Alternatively, aluminophosphate may be made by adding base to an acidic solution containing $Al^{+3}$ and $PO_4^{-3}$ ions, or alternatively it may be made by treating an alumina or aluminate support with a phosphate source such as phosphoric acid. In an embodiment, the aluminophosphate support may have a surface area ranging from about 100 $m^2$/g to about 500 $m^2$/g and a pore volume ranging from about 1.0 cc/g to about 2.5 cc/g.

Alternatively, the base support comprises silica-titania. The silica-titania support may be made by co-gelation, heterogeneous co-precipitation, or surface impregnation. In an embodiment, the silica-titania support may have a surface area ranging from about 250 $m^2$/g to about 600 $m^2$/g and a pore volume ranging from about 1.0 cc/g to about 3.0 cc/g.

As discussed above, the base support may comprise a mixed oxide in which the oxide components are silica, alumina, aluminophosphate titania, zirconia, etc., and combinations thereof, with unique microstructures, varied physical properties, and methods of making such materials. Such mixed oxides also have continuous, tightly packed, gel network which routinely contain the unique sheet structures.

Furthermore, the mixed oxides are homogeneous (i.e., no individual separate oxide phases are observed), and the pore size, pore size distribution, and volume (meso) of these materials can be tailored also.

The amount of base support present in the donor support may be equal to or greater than about 50 percent (%) support by total weight of the donor support, alternatively greater than about 75% donor support, alternatively greater than 95% donor support.

In an embodiment, the donor support is prepared by contacting a chromium-containing compound and a base support. It should be understood that other metal-containing compounds may be used in addition to or in lieu of the chromium containing compound. The chromium-containing compound and the base support may be of the type previously described herein. In an embodiment, the base support consists essentially of silica and the donor support may be prepared by contacting a chromium-containing compound and silica to form a Cr/silica support. In another embodiment, the donor support may be prepared by contacting a chromium-containing compound and a base support consisting essentially of alumina, to form a Cr/alumina support. In yet another embodiment, the donor support may be prepared by contacting a chromium-containing compound and a base support comprising silica-titania to form a Cr/silica-titania support. In yet another embodiment, the donor support may be prepared by contacting a chromium-containing compound and a base support comprising aluminophosphate to form a Cr/aluminophosphate support.

The chromium-containing compound and base support may be contacted by any means known to one of ordinary skill in the art. Examples of suitable contacting techniques include without limitation ion-exchange, incipient wetness, pore fill, aqueous impregnation, organic solvent impregnation, melt coating, dry mixing, or combinations thereof. Following contacting of the components, the donor support may be washed and/or dried to remove any solvent used during impregnation of the metal. The drying may be carried out in a temperature range of from about 25° C. to about 300° C., alternatively from about 50° C. to about 200° C., alternatively from about 80° C. to about 150° C. and for a time of from about 0.1 min to about 10 hours, alternatively from about 0.2 min to about 5 hours, alternatively from about 30 min to about 1 hour.

In some embodiments, following contacting of the chromium-containing compound and base support, the donor support may be activated by thermal treatment such as heating and/or calcining. For example, activation of the donor support may be achieved via heating the donor support in an oxidizing environment resulting in a donor support comprising Cr(VI). The heating may be carried out in a temperature range from about 200° C. to about 1,000° C., alternatively from about 300° C. to about 900° C., or alternatively from about 400° C. to about 850° C. for a time period of from about 0.5 hours to about 30 hours, alternatively from about 1 hour to about 15 hours, or alternatively from about 3 hours to about 10 hours. The oxidizing atmosphere may comprise oxygen, air, or combinations thereof.

In embodiments, the recipient support may be a virgin support, a partially metallized support, a support with no previous heat treatment, or combinations thereof.

In embodiments, virgin support may refer to a support compound that has not been contacted with and/or does not comprise a polymerization active compound. Such virgin supports may be commercially available compounds (e.g., base supports) that are used "as is" having not undergone any additional treatment following manufacture by a supplier, and thus are in an unadulterated state. Herein a polymerization active compound refers to a compound or species which may catalyze a polymerization reaction (e.g., polymerization of alpha olefins) or a precursor of such compounds or species. In embodiments, the virgin support does not comprise an amount of one or more metals effective to catalyze a polymerization reaction such as olefin polymerization. For example, the virgin support does not include Group VI metals such as Cr, Mo, and/or W in amounts effective to catalyze polymerization reactions. In an embodiment, the virgin support does not comprise chromium or a chromium-containing compound in an amount effective to catalyze a polymerization reaction.

In some embodiments the recipient support comprises a partially metallized support. Herein a partially metallized support refers to a support compound that has been contacted with a metal or metal containing compound (e.g., a polymerization active compound such as Cr) but is still not fully saturated with said compound. Further, a partially metallized support may comprise both polymerization active and inactive metal species. In an embodiment, a recipient support is any support material comprising less than a saturation level of a metal or metal-containing compound (e.g., a polymerization active compound such as Cr) and is capable of associating with an additional amount of such metal or metal-containing compound. As will be understood by one of ordinary skill in the art, the amount of polymerization active compound required to saturate any particular support material will depend on a variety of factors including for example and without limitation, the nature of the support material, the nature of the polymerization active compound, and the reaction conditions under which the materials are contacted. As such, the saturation level of the support materials may be determined by one of ordinary skill in the art.

In embodiments, the recipient support may have no thermal history. In other embodiments, the recipient support has a thermal history that may include calcination and/or drying. Conditions suitable for the calcination and/or drying of such materials are known to one of ordinary skill in the art. In an embodiment, the recipient support is a virgin support that has not undergone any additional heat treatment since being manufactured, or alternatively has not been previously heated to a temperature of equal to or greater than about 200° C.

In an embodiment, a method of preparing a polymerization catalyst comprises contacting the donor support with a recipient support. The polymerization catalyst may be prepared by contacting of the donor support and recipient support in a ratio of from about 100:1 to 1:100, alternatively from about 10:1 to about 1:10, alternatively from about 2:1 to about 1:5. Contacting of the donor support and recipient support may be carried out using any technique and under any conditions compatible with the components of this system and able to afford the intimate mixing of the component particles. For example, the donor support may be contacted with the recipient support via fluidized bed or by dry mixing followed by calcining in a static fixed bed, or by co-drying and co-calcining in a rotary kiln, or combinations thereof. In some embodiments, the contacting may be performed in an inert atmosphere, such as, for example, in the presence of an inert gas such as in the presence of nitrogen, argon and/or carbon dioxide.

In various embodiments, the recipient support may comprise any of the base support compounds described herein, provided that the recipient support does not contain a polymerization active compound, species, or precursor. In other embodiments, the recipient support consists essentially of one or more inorganic compounds, including but not limited to the base support compounds described herein. In an embodiment the recipient support comprises the same material as the base support in the donor compound. Alternatively, the recipient support comprises a different material than the base support in the donor compound. For example, the donor compound may comprise Cr/silica and the recipient support may comprise silica that has not been contacted with a polymerization active compound (e.g., Cr) and/or has not been subjected to temperatures equal to or greater than about 200° C. Alternatively the donor support comprises Cr/alumina and the recipient support comprises alumina; or alternatively the donor support comprises Cr/silica-titania and the recipient support comprises silica-titania. In other embodiments, the donor support comprises Cr/alumina and the recipient support comprises silica; alternatively the donor support comprises Cr/silica and the recipient support comprises alumina; alternatively the donor support comprises Cr/silica-titania and the recipient support comprises silica.

In the various embodiments disclosed herein, contacting of the donor support and recipient support may occur in one or more contact zones. A contact zone is a zone in which the components are commingled and/or combined, and thereby contacted. The contact zone may be disposed in a vessel, e.g. a storage tank, tote, container, mixing vessel, reactor, etc.; a length of pipe, e.g. a tee, inlet, injection port, or header for combining component feed lines into a common line; or any other suitable apparatus for bringing the components into contact. As used herein, the terms contacted and combined refer to any addition sequence, order, or concentration for contacting or combining two or more catalyst components. As a result of such contact or combination, the catalyst components may remain discrete, unattached or unbonded particles or may otherwise physically not combine, attach, bond, co-support, agglomerate, etc. In some embodiments, contacting of components may occur in one or more upstream contact zone(s) prior to further contacting with other catalyst component(s) in one or more downstream contact zone(s). Where a plurality of contact zones are employed, contacting may occur simultaneously across the contact zones, sequentially across the contact zones, or both, as is suitable for a given embodiment. Contacting may be carried out in a batch or continuous process, as is suitable for a given embodiment.

In embodiments utilizing a vessel for contacting the components, the components may be optionally mixed by a mixer disposed in the vessel and the formed mixture may then be further processed. In embodiments, utilizing a tee or other means for combining lines such as a header, an optional in-line mixer may be placed in the commingled catalyst feed line to ensure that adequate contacting of the combined components takes place, and the mixture is thus formed as it passes through the commingled feed line.

In an embodiment, the contacting may occur in a fixed bed reactor after mixing; alternatively mixing can occur in a fluidized bed reactor where the components are mixed and contacted in situ under conditions that allow for the intimate mixing of the donor support and recipient support. For example, the donor and recipient support may be introduced to a fluidized bed and allowed to contact in the presence of oxygen or air at an airflow rate of from about 0.01 to about 1.0 ft/s. The polymerization catalyst thus formed in situ may be exposed directly to reaction components under conditions suitable for carrying out a user-desired process.

In an embodiment, the mixture of the donor support and recipient support may be thermally treated following contacting; alternatively the donor support and recipient support may be simultaneously contacted and thermally treated. The thermal treatments may serve to activate the mixture of the donor support and recipient support to form the polymerization catalyst. The thermal treatments may further serve to mobilize a portion of the metal from the donor support to the recipient support to form the polymerization catalyst. In embodiments, the mobilized metal starts in an inactive state on the donor support (e.g., Cr(III)) and is in an active state on the recipient support (e.g., Cr(VI)). The mixture of the donor support and recipient support may be activated in-situ via heat treatment (e.g., calcination) as described previously herein. The resulting mixture of donor support and recipient support may function as a catalyst, for example a polymerization catalyst.

The polymerization catalyst comprising chromium may contain at least a portion of the total chromium as Cr(VI). Without wishing to be limited by theory, the polymerization catalyst when functioning as a polymerization catalyst may have the active site metals (i.e. Cr(VI)) undergo reaction with ethylene to generate divalent chromium Cr(II) which may serve as the active site for polymerization of an alpha olefin. In an embodiment Cr(VI) is reduced to Cr(II) during the polymerization of an alpha olefin. In another embodiment, the Cr(VI) may be reduced to Cr(II) by pre-contacting with a reducing agent such as for example and without limitation carbon monoxide (CO). In yet another embodiment, the Cr(VI) may be reduced to Cr(II) by contacting with a cocatalyst such as for example and without limitation an alkyl aluminum compound. Examples of suitable alkyl aluminum compounds include trialkyl compounds such as triethyl tripropyl and triisobutyl aluminums; alkyl aluminum hydrides such as diisobutyl aluminum hydride and diethyl aluminum hydride; and alkyl aluminum halides such as diethyl aluminum chloride.

The polymerization catalysts of the present disclosure are intended for any alpha olefin polymerization method known in the art, using various types of polymerization reactors. As used herein, "polymerization reactor" includes any polymerization reactor capable of polymerizing alpha olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor. Such reactors may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), which is well known in the art is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems are known in the art and may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the disclosure, a high pressure polymerization reactor may comprise a tubular reactor or an autoclave reactor, both of which are known in the art. Tubular reactors may have several zones where fresh monomer, initiators, or catalysts are added. Monomer may be entrained in an inert gaseous stream and introduced at one zone of the reactor Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. These reactors are known in the art.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

In an embodiment, a slurry polymerization process is employed in which the catalyst is suspended in an inert organic medium and agitated to maintain it in suspension throughout the polymerization process. The organic medium may, e.g., be a paraffin, a cycloparaffin, or an aromatic. For the production of ethylene polymers, the slurry polymerization process may be carried out in a reaction zone at a temperature of from about 50° C. to about 110° C. and at a pressure in the range of from about 100 psia to about 700 psia or higher. At least one monomer is placed in the liquid phase of the slurry in which the catalyst is suspended, thus providing for contact between the monomer and the catalyst. The activity and the productivity of the catalyst are relatively high. As used herein, the activity refers to the grams of polymer produced per gram of solid catalyst charged per hour, and the productivity refers to the grams of polymer produced per gram of solid catalyst charged.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, resistance to crack growth, long chain branching and rheological measurements.

The concentrations of monomer, co-monomer, hydrogen, co-catalyst, modifiers, and electron donors are important in producing these resin properties. Comonomer is used to control product density. Hydrogen is used to control product molecular weight. Co-catalysts can be used to alkylate, scavenge poisons and control molecular weight. Modifiers can be used to control product properties and electron donors affect stereoregularity. In addition, the concentration of poisons must be minimized since they impact the reactions and product properties.

After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Polymers such as polyethylene homopolymers and copolymers of ethylene with other mono-olefins may be produced in the manner described above using the catalyst (i.e., polymerization catalyst) prepared as described herein. Polymer resins produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth. Additional end use articles would be apparent to those skilled in the art.

In an embodiment, the production of a polymerization catalyst by the methodologies disclosed herein may lead to an increased amount of Cr(VI) available on the support and the formation of an increased number of catalytically active polymerization sites resulting in the polymerization catalyst having a higher productivity level than the donor support. Since the recipient support is more economical than the chromium containing compound, the polymerization catalyst resulted by the methodologies disclosed herein may result in an improvement in the overall process economics.

EXAMPLES

The invention having been generally described, the following examples are given as particular embodiments of the invention and to demonstrate the practice and advantages thereof. It is understood that the examples are given by way of illustration and are not intended to limit the specification of the claims to follow in any manner.

The following materials were used throughout the remainder of the examples as indicated. The silica support material used was ES70 which is a support that is commercially available from Inneos Co. and has an average particle size of 50 μm, a surface area of 300 m$^2$/g, and a pore volume of 1.6 cc/g.

The Cr/silica component was made by impregnating the silica to incipient wetness with 5 wt % Cr as an aqueous $CrO_3$ solution. The solution was then stir-dried by evaporation at room temperature until free flowing.

The alumina base used was alumina-A which is another support that is commercially available from W.R. Grace. The alumina has an average particle size of 100 μm, a surface area of 300 m$^2$/g, and a pore volume of 1.3 cc/g.

The Cr/alumina component was made by impregnating the alumina base with about 6 wt % Cr as an aqueous $CrO_3$ solution. The solution was then stir-dried by evaporation at room temperature until free flowing.

The silica, Cr/silica, alumina, and Cr/alumina were then dried individually in a fluidized bed by raising the temperature up to 200° C. At this stage, all components were referred to as virgin. The drying was done to ensure that all liquid water was removed from pores before the physical blending of these components in order to avoid chromatographic movement of pore water and Cr from one component to another. In some examples, the components were activated by calcining to a temperature higher than 200° C. using a procedure described herein. The support component (either silica or alumina) and the Cr-containing component (either Cr/silica or Cr/alumina) were mixed in a ratio of 3:1 of support: Cr-containing compound. Specifically, about 10 grams of the mixture was placed in a 1.75 inch quartz tube fitted with a sintered quartz disk at the bottom. While the mixture was supported on the disk, pure oxygen, previously dried through a 13x molecular sieve column, was blown up through the disk at the linear rate of about 1.6 to 1.8 standard cubic feet per hour to create a fluidized bed. In some examples, dried nitrogen or air was used as the fluidizing gas in place of oxygen. An electric furnace around the quartz tube was then turned on and the temperature was raised at the rate of 400° C. per hour to 400° C. (first co-activation temperature). The mixture was allowed to fluidize for 24 hours in the dry oxygen. Then, some portion of the mixture was collected as the first sample and stored under dry nitrogen for protection from the atmosphere before testing. The remaining of the mixture was then heated to 500° C. (second activation temperature) at the same heating rate, allowed to fluidize for 24 hours in dry oxygen, followed by the second sampling. Similarly, the procedure was carried out at co-activation temperatures of 600° C., 700° C., 800° C., and 900° C. for the third, fourth, fifth, and sixth samplings respectively. In this way, the last sample taken at 900° C. had experienced the cumulative effect of all previous co-activation temperatures. This fact will be utilized in the interpretations of results later herein.

The Cr(VI) content on the samples was measured by titration against ferrous ammonium sulfate. Specifically, about 0.5-1 gram of the sample was immersed in 2N sulfuric acid solution and stirred for 30 minutes prior to the titration. Two drops of phenanthroline iron (II) sulfate solution was added as the indicator. Ferrous ammonium sulfate titrant solution was calibrated against a standard solution of potassium dichromate, all of which are commercially available from Aldrich Co.

Example 1

In this example, a simple analytical technique was used to explore the saturation level of Cr(VI) at different calcining conditions. The technique relied on the previously defined tendency of supports to "saturate" with Cr(VI). For each substrate, and set of calcining conditions, the surface will only hold a certain maximum level of Cr(VI). If more is applied the excess simply decomposes into trivalent chromium. FIG. 1 is a plot of Cr(VI)/nm$^2$ activation as a function of the initial chromium loading after calcining at 425° C., 650° C. and 870° C. as indicated, which shows this saturation behavior. These catalysts were made by impregnation of $CrO_3$ onto a Davison Grade 952 silica. Calcination of the sample was carried out in a 1.875 inch diameter quartz tube, outfitted with a sintered quartz distribution plate. Fluidization gas was dry oxygen at 1.4 ft$^3$/h velocity with a hold time of 5 hours.

Thus, a silica can be co-activated with a Cr/silica, one that contains more Cr than is allowed to be Cr(VI) by its saturation coverage. After activation the Cr(VI) content of the mixture was determined by titration. If the conversion to Cr(VI) is higher than would be possible from the Cr/silica component alone, then migration must have occurred to the pure silica in order to support the extra Cr(VI). The results demonstrate the maximum loading of Cr(VI) under these conditions occurs at 425° C.

Example 2

In this example, migration between virgin silicas was investigated. One part of virgin Cr/silica was physically mixed with three parts virgin silica and the two co-activated by fluidization at various temperatures in dry oxygen for 24 hours. By "virgin" it is meant that the component had no prior heat treatment other than being dried at 200° C. to first remove any residual liquid pore water prior to mixing. Co-activation experiments were done every 100° C. between 400° C. and 900° C. As a "control" for the series, similar one-component activations of Cr/silica alone were also conducted. The results of these experiments are shown in FIG. 2, indicating the retention of Cr(VI) on these samples.

Figure 2:
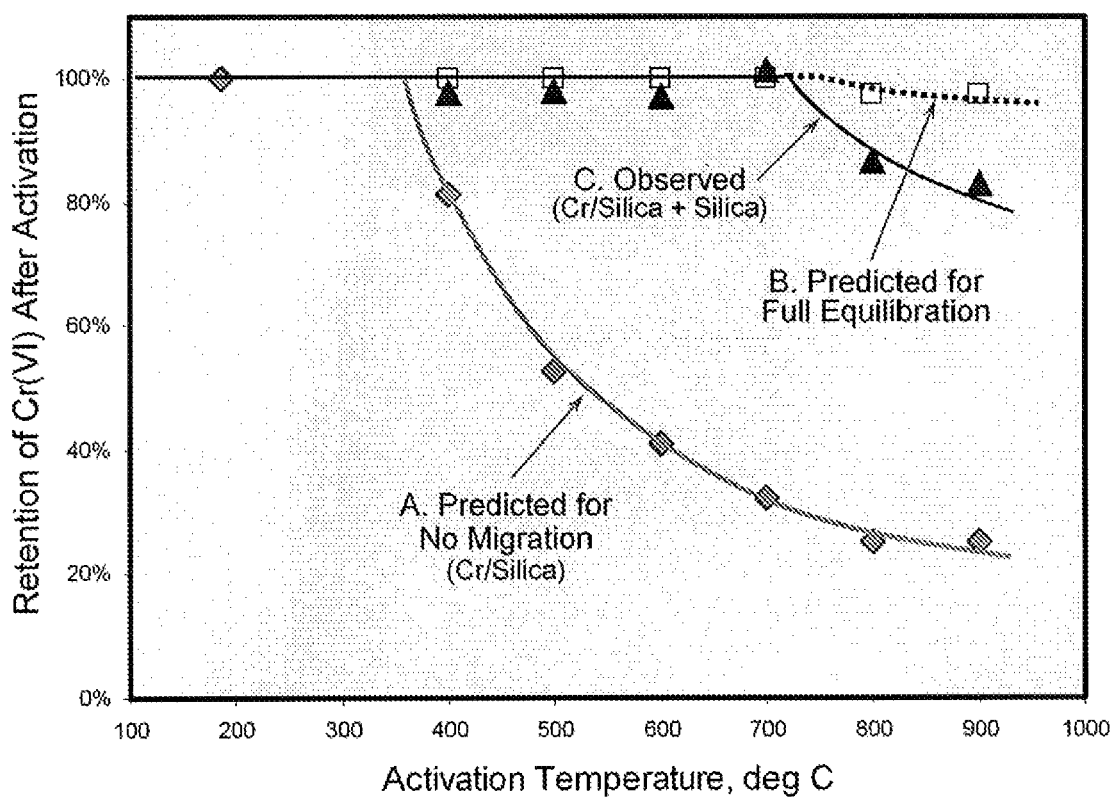
FIG. 2 is a plot of the retention of Cr(VI) as a function of activation temperature for the samples from Example 2.

The change in Cr(VI) is quantified in FIG. 2, which plots the amount of Cr(VI) retained after activation as a function of the activation temperature. In this case the axis is not expressed as Cr(VI) atoms/nm$^2$, but instead as a percent of the total chromium present that is retained as Cr(VI). The lower curve, curve A, plots the one-component activation of Cr/silica alone. This curve shows the saturation behavior observed in FIG. 1. The silica cannot hold more Cr(VI) than this value, so even at 400° C. there is already a loss of Cr(VI). Curve A also represents what would be observed from the co-activated mixture of Cr/silica with silica if there were no migration of Cr between the two components. In curve A the amount of Cr(VI) retained is limited by the amount of silica surface available only on the one Cr/silica component.

In contrast the upper curve, curve B, in FIG. 2 represents the amount of Cr(VI) that could be expected from full equilibration of the Cr between the two silica sources. This curve is simply curve A multiplied by 4, since there is now 4 times as much silica surface available (from a blend ratio of 1 part Cr/silica and 3 parts silica). There is now enough surface available that only at 800° C. and 900° C. would saturation coverage be expected to result in a small loss of Cr(VI). At other temperatures all of the chromium should remain hexavalent, being not limited by the saturation coverage maximum.

Curve C of FIG. 2 plots the Cr(VI) retention values actually observed from the co-activated mixtures. Since every point on curve C is above that on curve A, it is clear that a large migration of chromium has definitely taken place, even at 400° C. It is possible that migration would have occurred at even lower temperatures, but this was considered beyond the reliability of the technique. Since all of the chromium is hexavalent between 400 and 700° C., one cannot tell if full equilibration of the Cr(VI) has occurred between the two sources of silica, or something less. The points at 800 and 900° C., however, do suggest some quantification of the amount of transfer. About 85% of full equilibration has been reached under these conditions, although one cannot tell at what temperature this level of transfer occurred.

Example 3

Four possible methods of transferring chromium to a virgin silica support were investigated.

I. Transfer by Chromatography

The possibility of chromium transfer by chromatographic evaporation and wicking of liquid water from pores was investigated. Commercial silicas and Cr/silica catalysts usually still contain 8-10% pore water even after drying at 100° C. During heat treatment between 100 and 150° C., the pore water was visually observed to be leaving the pores. Local gradients of Cr in the bed were seen carried from the interior of the bed by pore water moving upward by evaporation. Thus, Cr could transfer from one particle to another, depending on how much pore water is left behind after drying.

II. Transfer by Chromium Evaporation

The possibility that transfer of chromium occurs through evaporation and re-deposition of the chromium onto its neighboring particle was investigated. Two different Cr/silica catalysts were analyzed by X-ray fluorescence (XRF) before and after activation at 900° C. for 24 hours in flowing oxygen. The results of this analysis are listed in Table 1. The results demonstrate that within the accuracy of the experiment no Cr was lost.

TABLE 1

Analysis by XRF of Cr/silica before and after activation.

| | Cr/Si Ratio by XRF | |
|---|---|---|
| Sample | Virgin | After 24 h at 900° C. |
| Catalyst 1 | 0.113 | 0.112 |
| Catalyst 2 | 0.082 | 0.104 |

Figure 3:
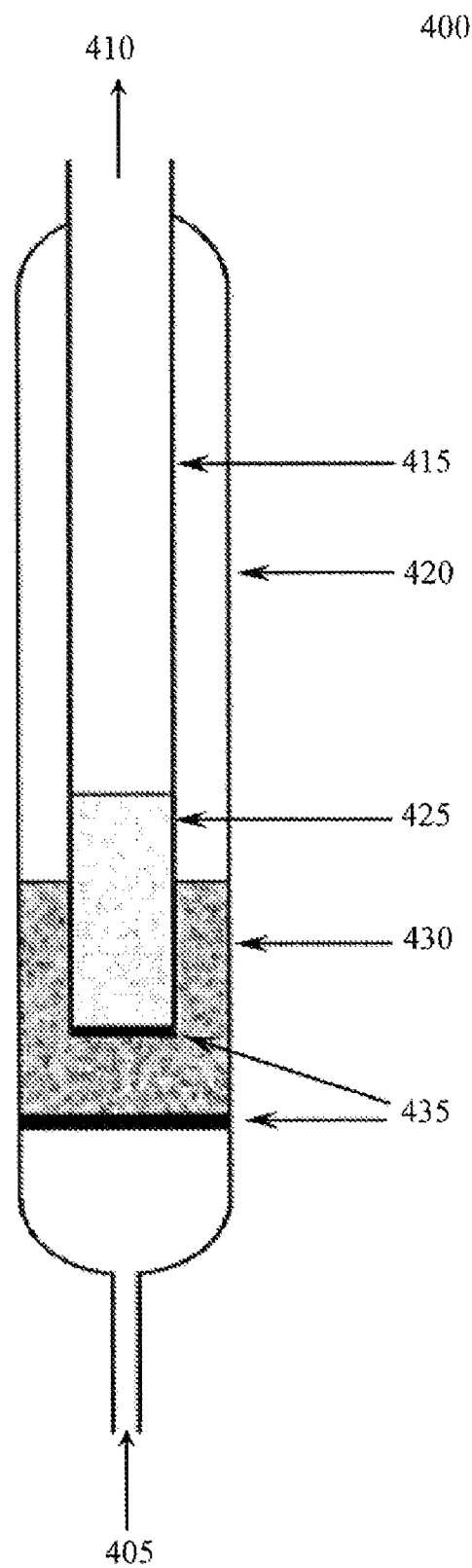
FIG. 3 is an illustration of a double tube activator.

Cr evaporation as the mechanism of Cr mobility was investigated using a double tube activator as illustrated in FIG. 3. Referring to FIG. 3, the double tube activator 400 was constructed from quartz glass where the outer tube 420 contained Cr/silica 430 while the inner tube 415 contained silica 425; both the Cr/silica 430 and silica 425 were supported on porous sintered quartz disks 435 which were about 2 mm thick; oxygen entered the system from feed stream 405 and exited the system from outlet stream 410. During activation the design forced oxygen to first move though the Cr/silica bed 430 at high temperature, presumably carrying any volatile Cr with it, and then through the silica bed 425 held at exactly the same temperature. Once loaded, the double-tube activator 400 was surrounded by an electrical furnace (not shown) and activation was carried out as described above in dry oxygen for 24 hours at 900° C. Although several tests were conducted in this way, no evidence was ever found of Cr transfer from one bed to the other. This suggests that the transfer does not proceed via vaporization of the Cr, or at least that it cannot span a 2 mm distance in the gas phase at 900° C.

III. Transfer by Redox Cycling (Migration in $N_2$)

An alternate mechanism of Cr migration through particle contact was investigated. The possibility that Cr migrates through a cycling between Cr(III) and Cr(VI) on the surface was investigated. This mechanism is shown in Scheme 1:

Scheme 1

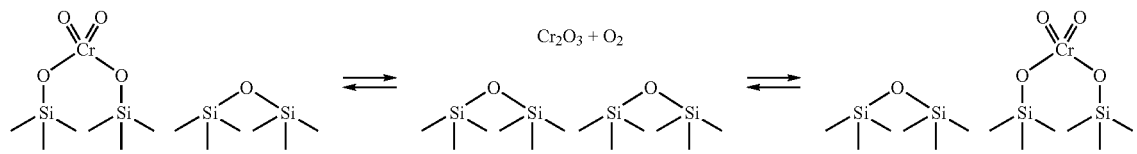

Figure 4:
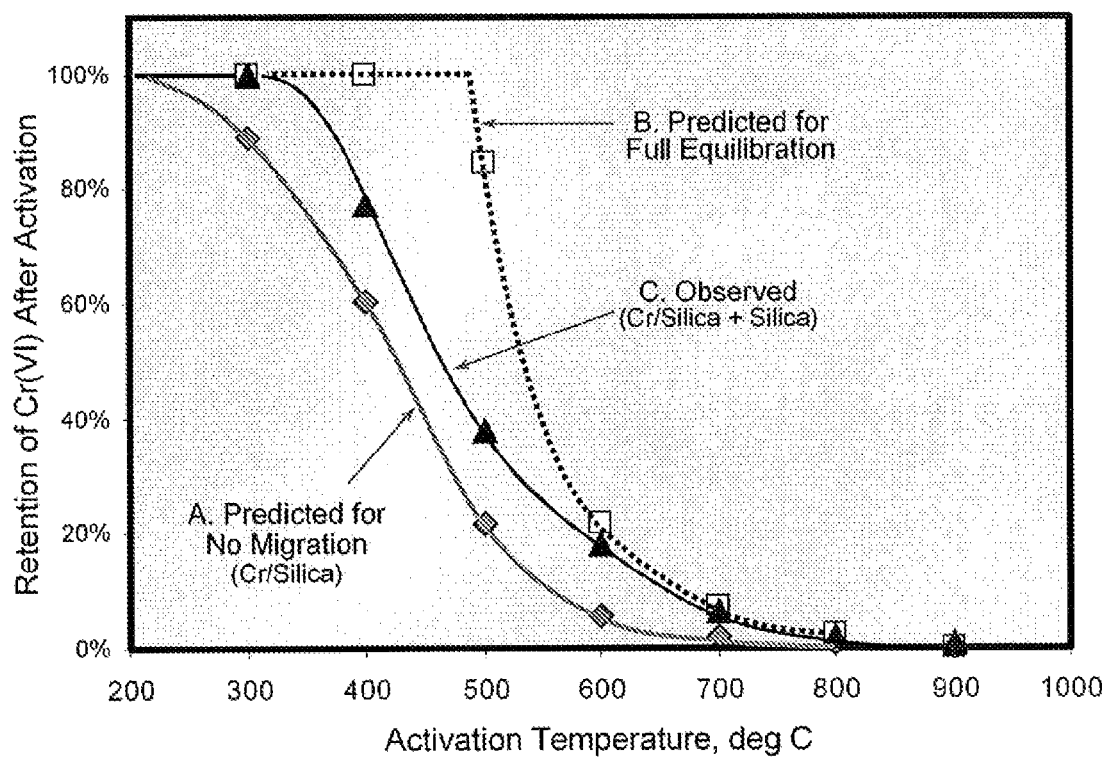
FIGS. 4-6 are plots of the retention of Cr(VI) as a function of activation temperature for the samples from Example 3.

Such cycling requires oxidation of Cr(III) by oxygen gas. In the absence of oxygen transfer should not be possible. Therefore the experiment in Example 2 was repeated, except that the calcining was done in flowing dry nitrogen instead of oxygen. Cr(VI)/silica, containing about 5% Cr and dried at 200° C., was mixed in a 1:3 ratio with virgin silica, also previously dried at 200° C. The mixture was then heated to various temperatures, ranging from 300° C. to 900° C., and held there for 24 hours fluidized under flowing nitrogen. After each heating step, a sample was taken for analysis, and then the remaining mixture was heated up to the next progressively higher temperature. For comparison a control series was also made using the Cr(VI)/silica alone which was exposed to the same heating procedure. The results of these experiments are shown in FIG. 4.

The results demonstrate that there is major loss in Cr(VI) when the calcining is done in nitrogen. Cr(VI) decomposes into Cr(III) and oxygen at an early temperature, and the oxygen by-product is swept away by the nitrogen, making reoxidation impossible. Despite the severe and early loss of Cr(VI) however, it is clear the some transfer did occur. Curve A in FIG. 4 shows the control run with Cr/silica heated alone where no transfer occurs. This curve represents the maximum amount of Cr(VI) that can be supported by the original Cr/silica component. Curve B is just curve A multiplied by four. It represents the result expected in the event that there is complete equilibration between the two silica sources. Curve C plots the actual results obtained from the co-activation of the mixture. It lies intermediate between curve A and curve B, indicating that some transfer occurred, even at 300° C., despite rapid decomposition of Cr(VI). At 600° C. the migration became so strong that it almost reached a full equilibrium. That is, curve C and curve B merge at about 600° C.

This suggests that redox cycling, although it almost certainly occurs, is not the only or even the primary means of Cr movement.

IV. Transfer by Hydrolysis (Migration Between 900° C. Silicas)

Another mechanism of Cr migration was investigated. In this case Cr migration by hydrolysis and reformation of Cr—O—Si bonds, either by neighboring surface silanols or by traces of moisture in the fluidization gas was considered. This mechanism is depicted in Scheme 2:

Scheme 2

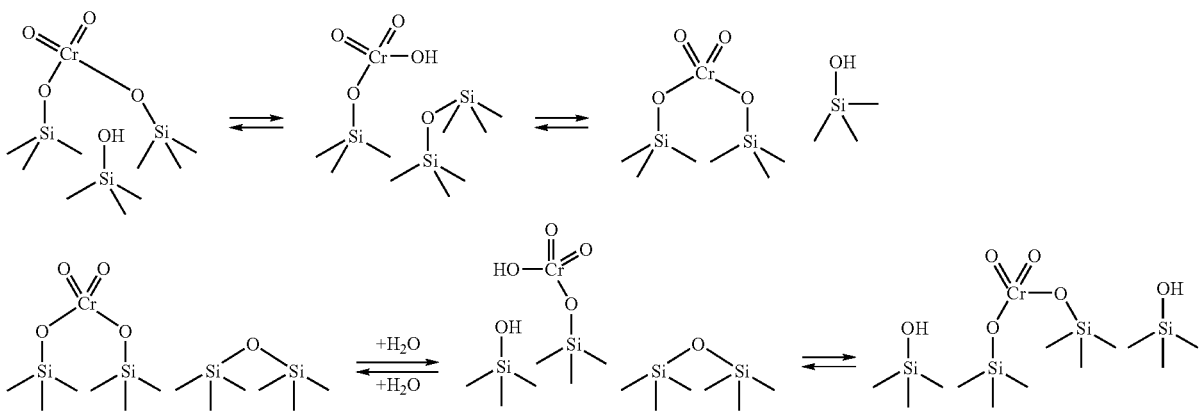

Figure 5:
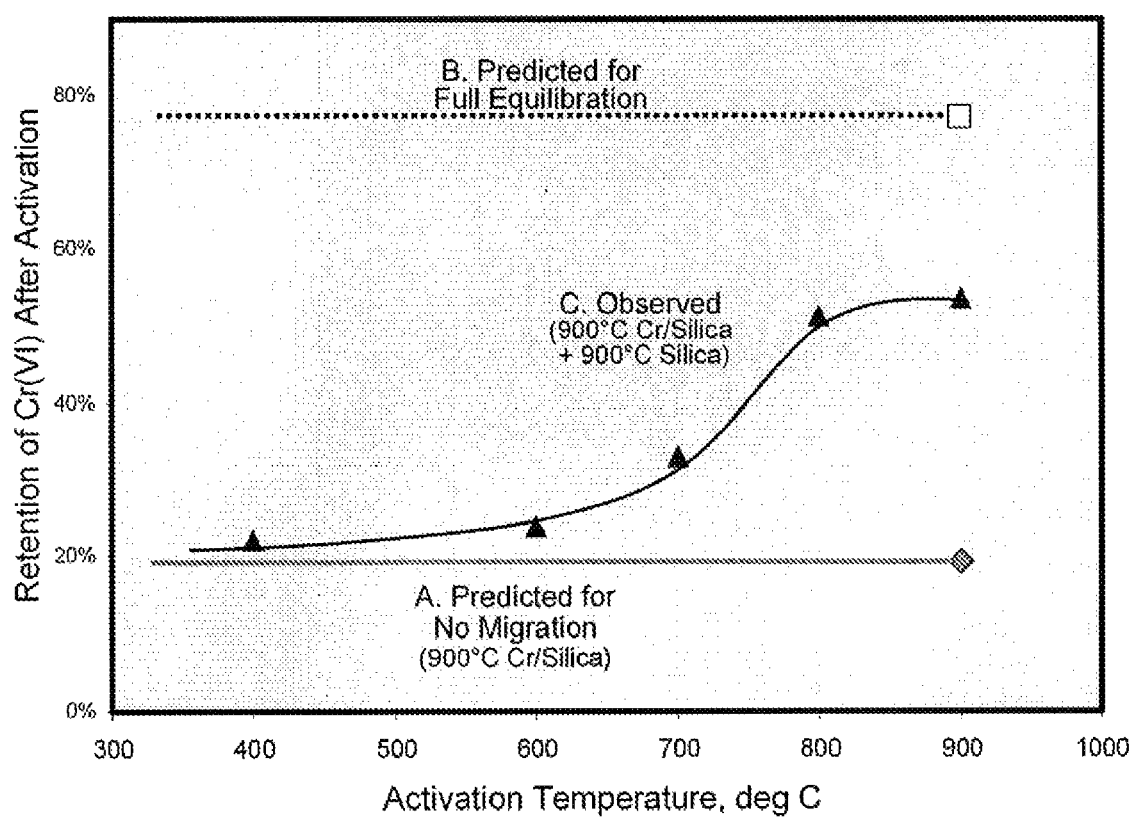

To test these possibilities Cr/silica and silica were again co-activated as before, except that each component had first been activated alone in oxygen for 24 hours at 900° C. before mixing. Cr/silica containing 5% Cr was activated alone at 900° C. and silica was also calcined alone at 900° C. Then they were mixed together in a ratio of 1:3 (Cr/silica to silica) and co-activated at various temperatures from 400° C. to 900° C. in dry oxygen for 24 hours. If moisture is required for Cr migration, then transfer of Cr should be severely inhibited under these conditions. The results of these experiments are plotted in FIG. 5.

Again three lines are shown. Line A shows the control run with 900° C. Cr/silica. Having been already calcined at 900° C., re-activation at lower temperatures changes nothing. The Cr(VI) amount is irreversibly set by the 900° C. treatment, and so a horizontal straight line is obtained. This line also represents the results expected from the mixture if no migration occurs. Line B is line A multiplied by four, representing the Cr(VI) values expected if there is full equilibration of the Cr between the two components. And line C plots the results actually obtained from the mixture.

In this example there is almost no migration of Cr at 400° C. and even up to 700° C. the migration is rather minor. Only at the highest temperatures, 800-900° C. does the transfer become more significant, reaching about 60% of full equilibration. This result is a strong indication that the extent of surface annealing or dehydration governs the transfer of Cr(VI). Whether this indicates the direct participation of surface silanols or not is uncertain. It could also reflect the general annealing and reorganization of the surface that accompanies high temperatures. It is possible that for the Cr to be mobile, the silica surface itself must also be somewhat mobile. Once annealed at 900° C., it may require similar temperatures to obtain significant mobility again. Alternatively one might speculate that traces of moisture in the gas stream are needed from migration, and that once calcined at 900° C., the supports do not release moisture until that temperature is again approached.

Figure 6:
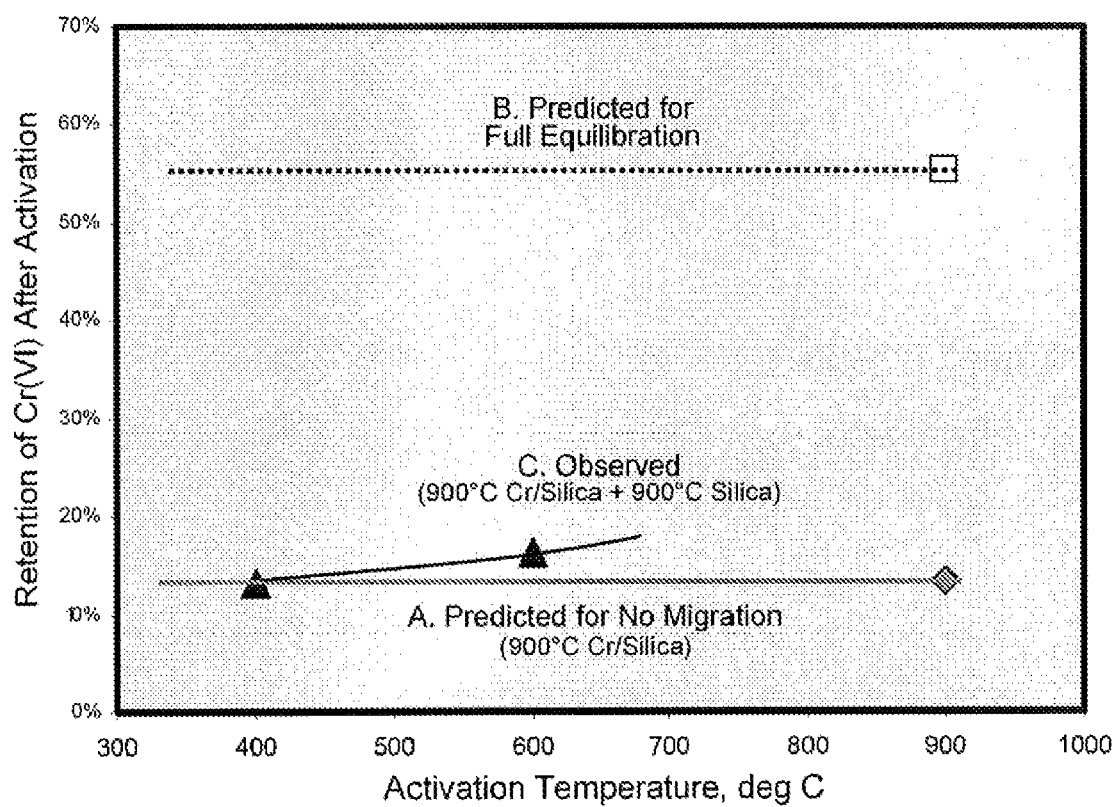

To distinguish between these two possibilities, the experiment was repeated, except that the co-activation was performed in oxygen that was first sparged through distilled water, to reach 100% humidity at 25° C. That is, Cr/silica, calcined in dry oxygen, was mixed with silica, also calcined in dry oxygen, and the two were co-activated in wet oxygen at 400° C. and 600° C. If moisture in the gas stream is primarily responsible for transfer, one might expect to see more migration than was seen in FIG. 4 above. The results are shown in FIG. 6. There is no change in migration compared to FIG. 5. This suggests that moisture in the gas stream is not the primary driver of Cr transfer, or that 900° C. silica is not easily rehydrated under these conditions.

Example 4

Figure 7:
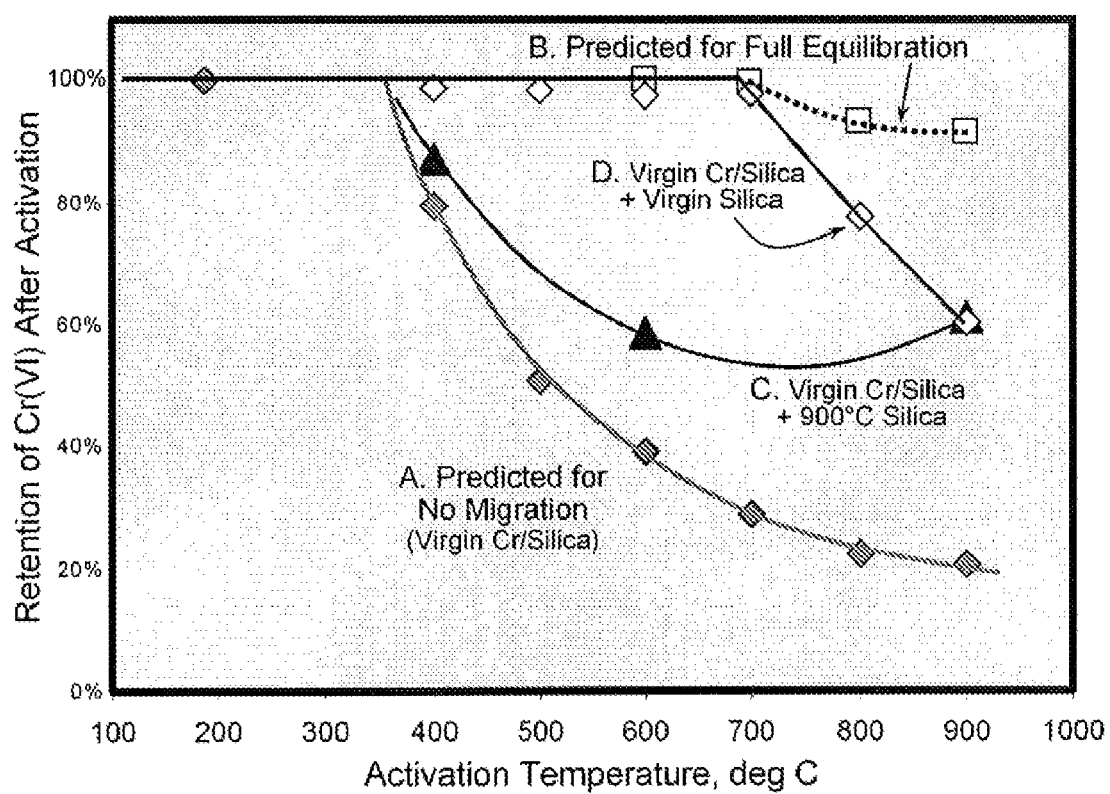
FIGS. 7-8 are plots of the retention of Cr(VI) as a function of activation temperature for the samples from Example 4.

In this example, migration between virgin and calcined silica was investigated. Virgin Cr/silica (dried at 200° C.) was mixed with three parts silica that had already been calcined at 900° C. This mixture was then co-activated at 400-900° C. in oxygen for 24 hours. The results of this experiment are shown in FIG. 7.

Figure 8:
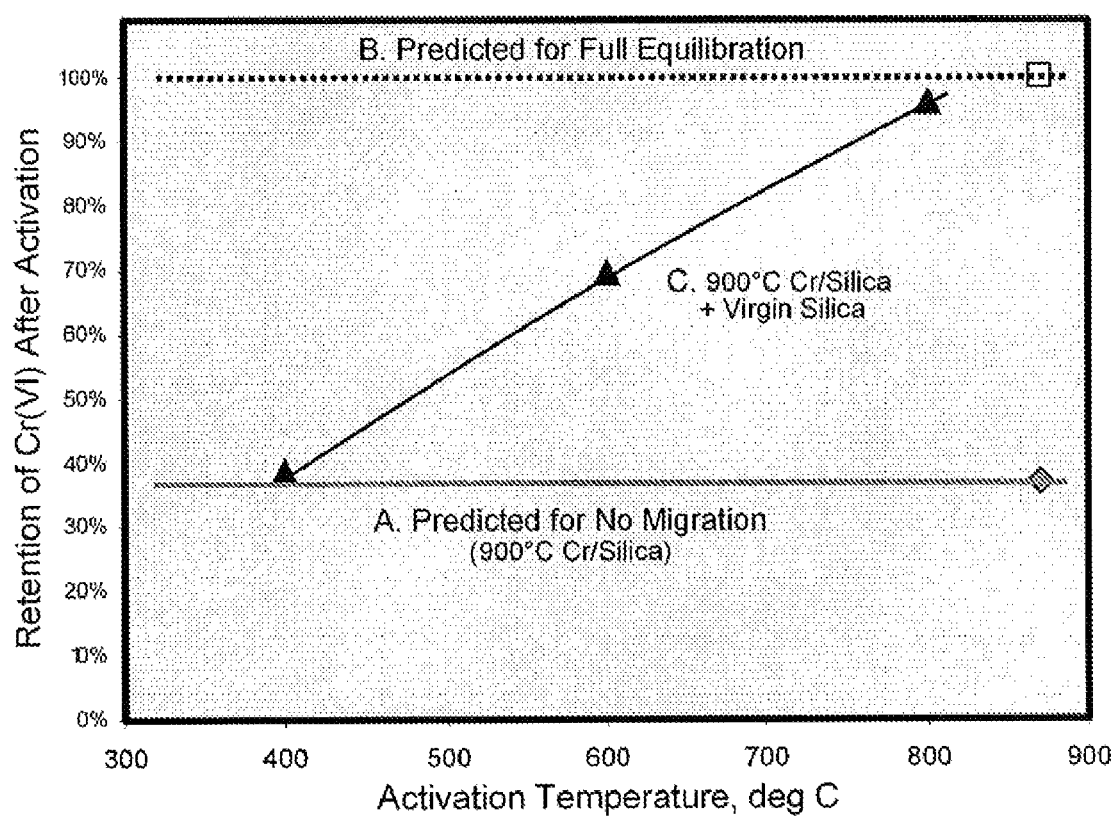

Comparing the experimental curve C with control curves A and B, a small amount of migration was observed to have occurred at 400° C. This is in agreement with FIG. 5 (Example 3), and suggests that both surfaces need to be hydrated for effective transfer at low temperatures. More migration occurred at 600° C., although it is not clear that this represents any more than occurred in FIG. 5 (Example 3). By 900° C., however, significant migration has occurred, representing about 56% of the equilibrium value. Also shown in FIG. 7, for comparison, is curve D derived from co-activation of virgin Cr/silica with virgin silica. There is a major difference between curve C and curve D, strongly indicating that Cr moves more easily on the hydrated materials at low temperature. At 900° C., however, both curves merge as might be expected. The reverse experiment was also carried out, in which 900° C. Cr/silica was co-activated with 200° C. silica. In this case the Cr/silica was a commercial grade sold by Inneos as EP30X containing 1% Cr and having an average particle size of about 100 microns. It was commercially activated in dry air, then co-activated with three parts of virgin silica in dry oxygen for five hours. The results are shown in FIG. 8. Again no migration was observed at 40° C. However, by 600° C. the transfer of Cr became quite significant, and by 800° C. it had reached full equilibration. Thus the transfer from an annealed surface to a virgin one seems to have occurred more easily than when carried out in the reverse direction. The catalyst was observed to have a color change from green to yellow which indicated a migration of the Cr to the virgin silica.

Example 5

Figure 9:
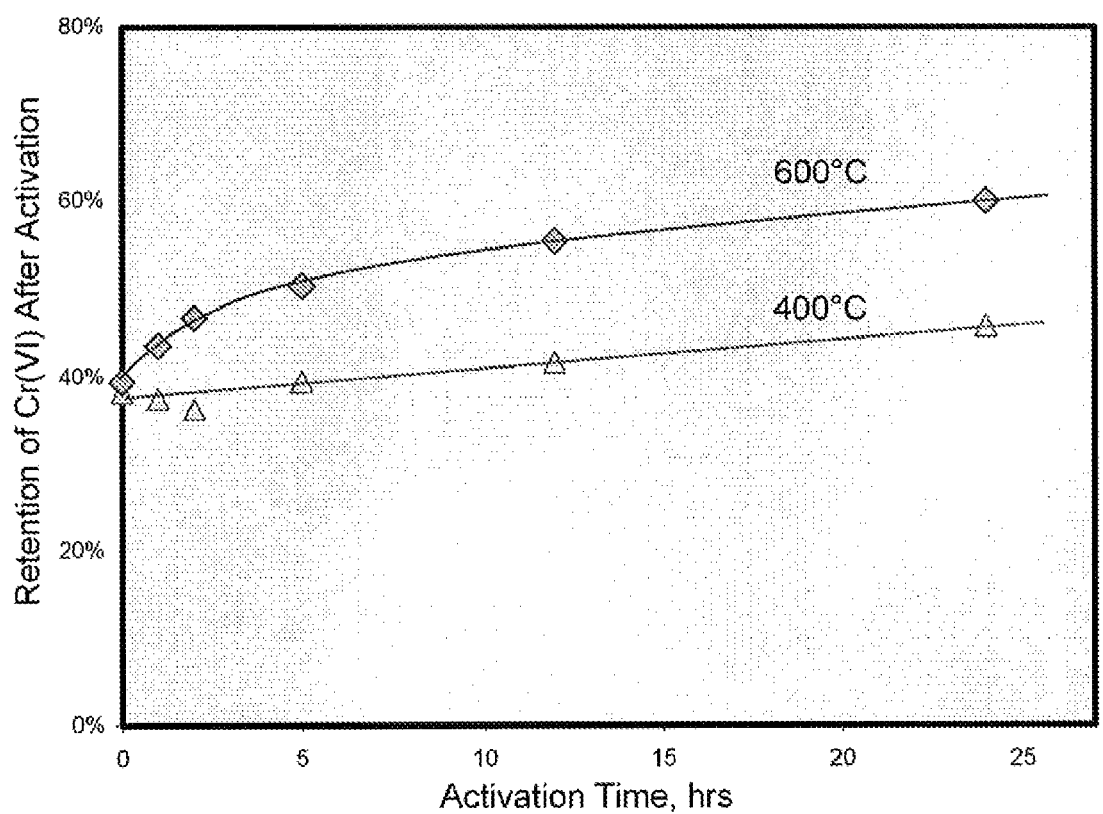
FIG. 9 is a plot of the retention of Cr(VI) as a function of activation temperature for the samples from Example 5.

In an effort to understand how quickly the transfer rate of Cr occurs between silicas within the temperature range of 400° C. to 900° C., two experiments were done using intermediate temperatures. Cr/silica and silica, both individually calcined at 600° C., were physically mixed in a 1:3 ratio, then co-activated in oxygen for various times ranging from 1 to 24 hours. One series of samples was co-activated at 400° C. and another at 600° C. The results of these experiments are plotted in FIG. 9. It is clear from the graph that equilibration is not immediate, but takes prolonged contact under these conditions. Equilibrium has not been reached even after 24 hours. Predictably migration was somewhat faster at 600° C. than at 400° C.

Example 6

Three types of migrations were investigated; migration between virgin aluminas, between calcined aluminas, and between virgin and calcined aluminas.

Figure 10:
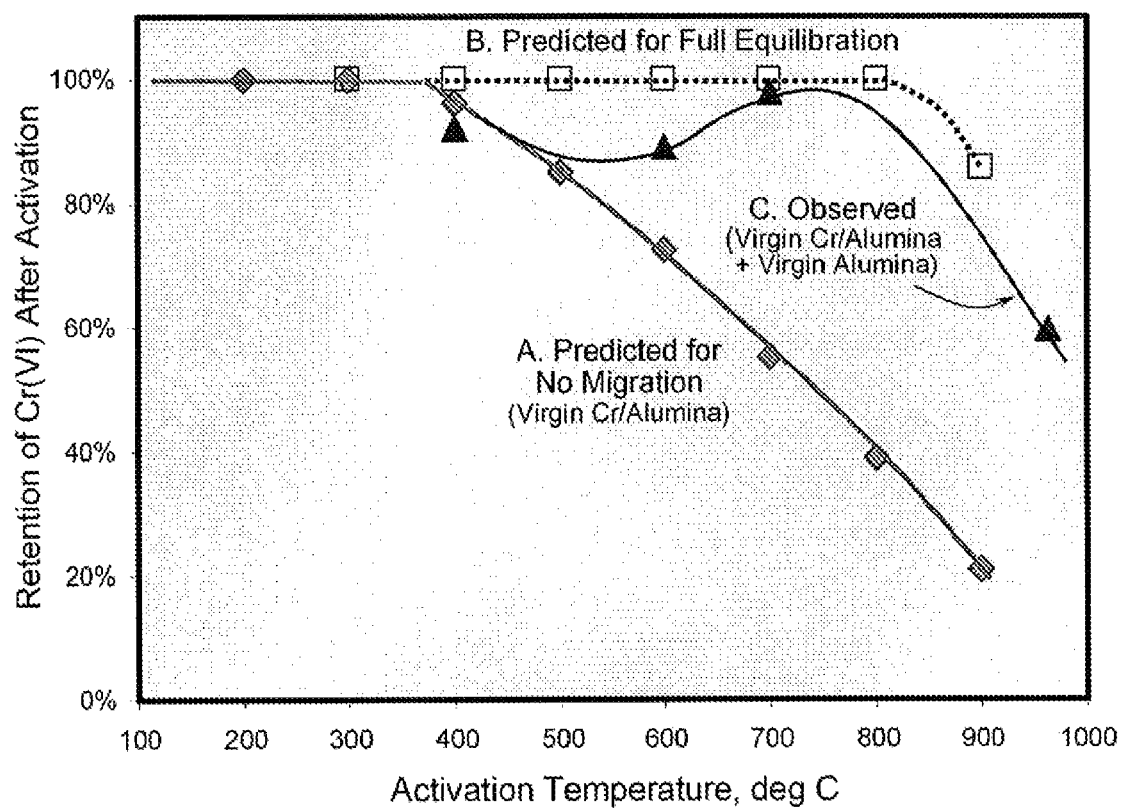
FIGS. 10-13 are plots of the retention of Cr(VI) as function of activation temperature for the samples from Example 6.

In order to investigate the migration between virgin alumina, some tests were carried out to determine whether Cr(VI) could transfer between alumina bases. FIG. 10 plots the result of co-activating 1 part virgin Cr/alumina with 3 parts virgin alumina at various temperatures. Although the test becomes more uncertain for alumina, it was observed that the same pattern of Cr migration seen between silicas also applies to aluminas. Migration can be seen at temperatures as low as 400-500° C., and at 900° C. the transfer reached about 85-90% of the value expected from full equilibration. This behavior is comparable to what was observed between virgin silicas in FIG. 2 (Example 2) under the same conditions.

Figure 11:
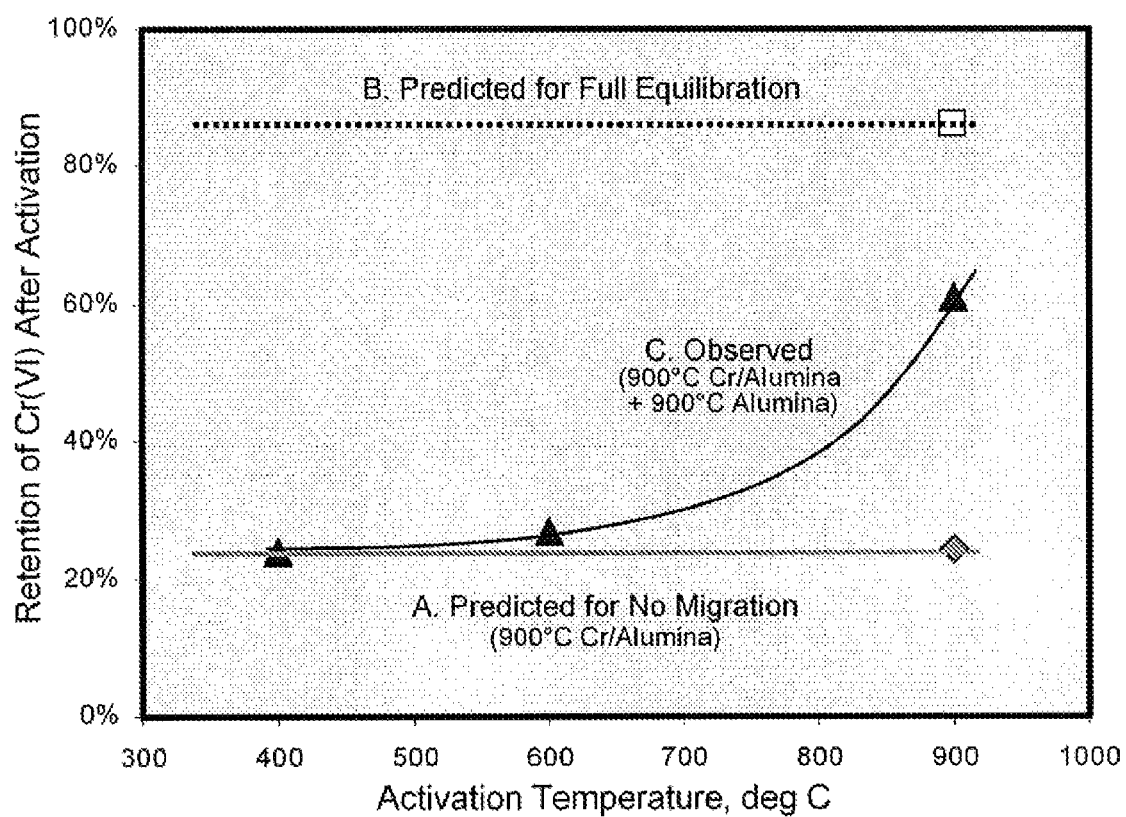

For migration between calcined aluminas, the two alumina components were calcined before mixing and co-activation to determine what effect this had on the Cr migration. Cr/alumina, previously calcined at 900° C., was mixed with three parts alumina, which had also been calcined at 900° C. These two components were mixed and the co-activated in oxygen at various temperatures as described above. The results of these experiments are shown in FIG. 11. No migration at all was observed at 400° C., and barely a trace at 600° C. By 900° C., however, Cr transfer did occur, achieving about 60-65% of the value expected from full equilibration. This behavior is very similar to that observed between calcined silicas in FIG. 5 (Example 3). This result is another indication that the extent of surface annealing or dehydration strongly influences the transfer of Cr(VI).

Figure 12:
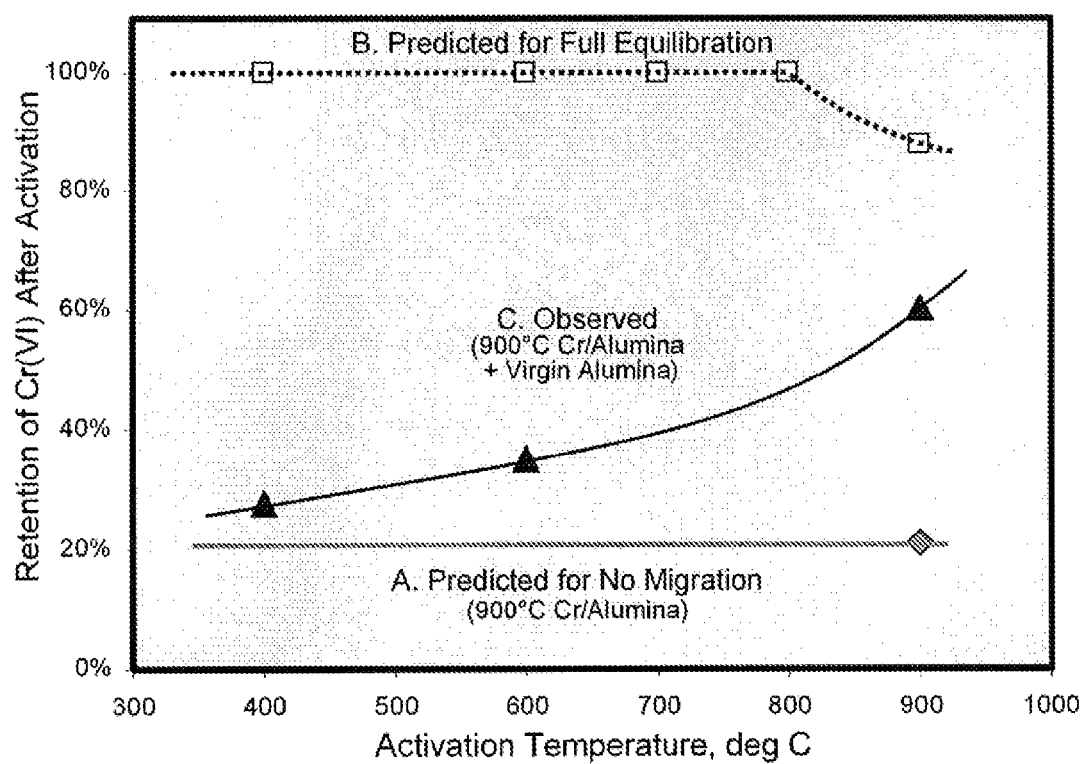

For migration between virgin and calcined aluminas, the Cr/alumina, which had already been calcined at 900° C. in oxygen, was co-activated with virgin alumina at various temperatures. The degree of migrations was plotted in FIG. 12. Referring to FIG. 12 at 400° C., very little migration was observed. The amount increased slightly at 600° C., and then became more significant at 900° C., reaching 61% of the equilibrium value. Thus the transfer behavior between aluminas was similar to that observed between silicas, in FIG. 8 (Example 4).

Figure 13:
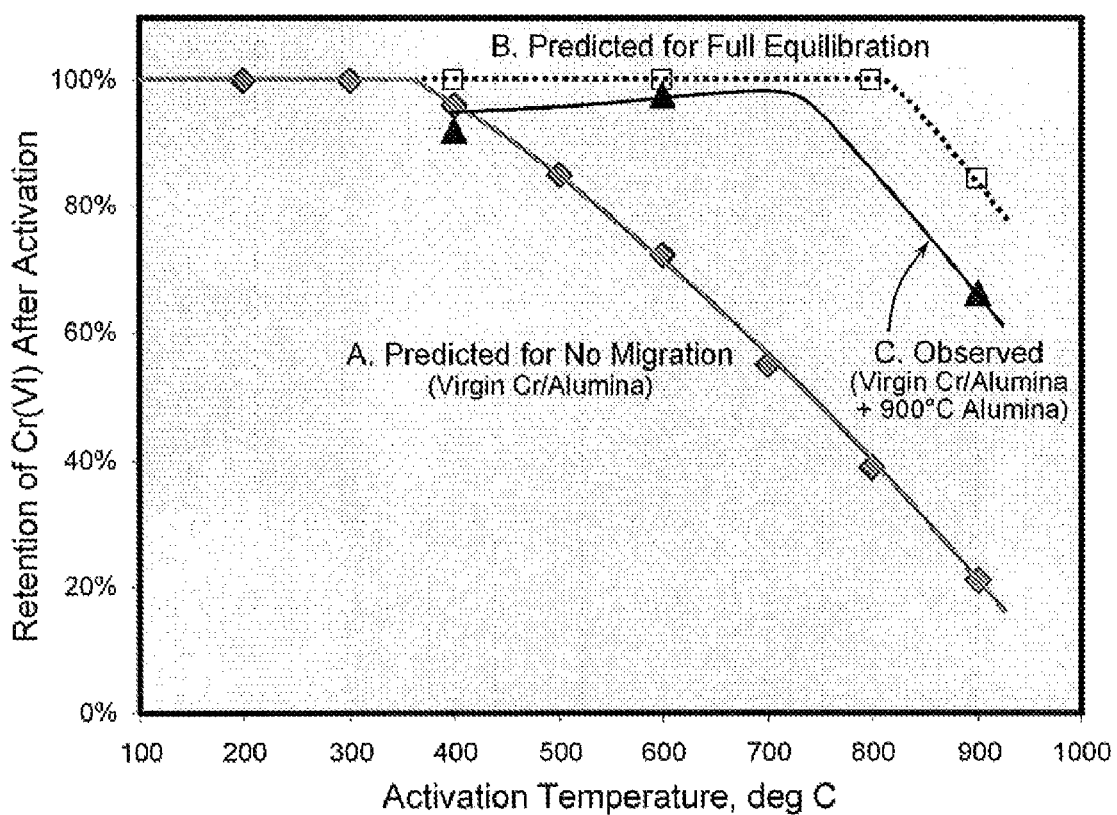

FIG. 13 shows the opposite combination. Virgin Cr/alumina was co-activated with alumina that had been previously calcined at 900° C. At 400° C. it is not clear whether migration occurred, but given the result in FIG. 12, it seems likely that little transfer may have occurred. By 600° C. significant transfer was observed, and at 900° C. a high degree of migration occurred, reaching about 70-75% of full equilibration. Thus once again the transfer behavior between aluminas seems very similar to that between silicas, as shown in FIG. 7 (Example 4) for comparison.

Example 7

In this example, migration between alumina and silica was investigated. The four combinations that were investigated are between virgin silica and virgin alumina, calcined silica and calcined alumina, virgin silica and calcined alumina, and calcined silica and virgin alumina.

Figure 14:
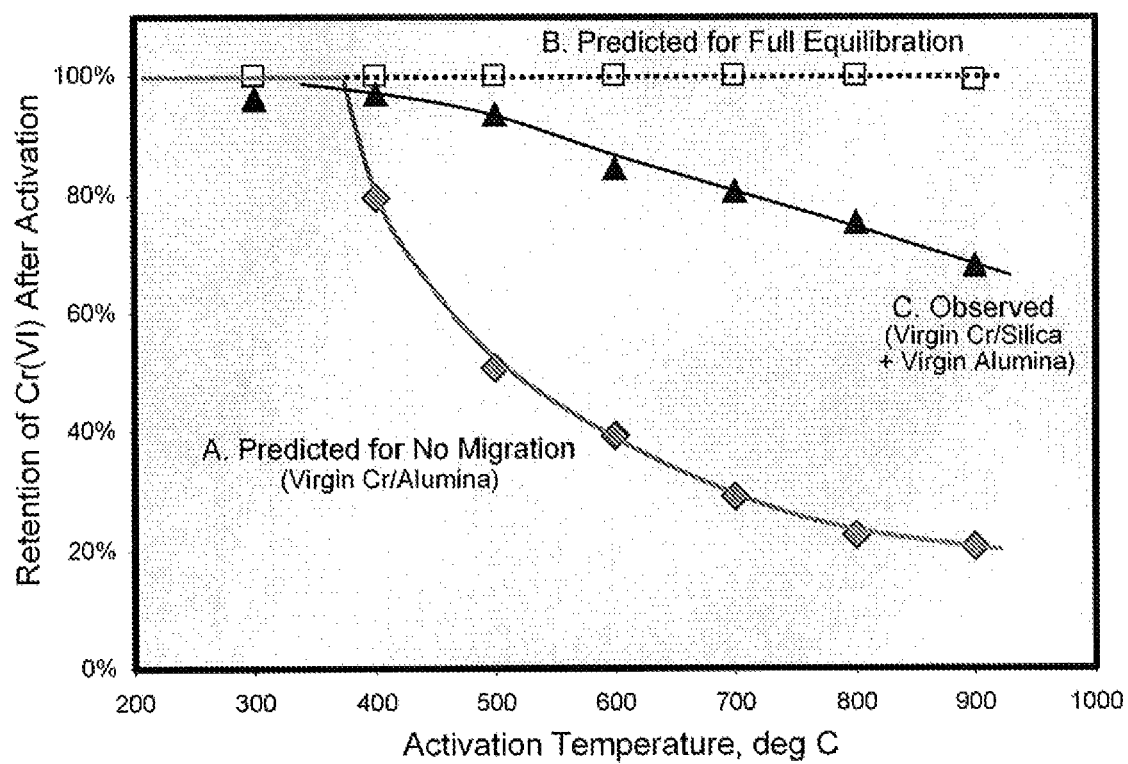
FIGS. 14-19 are plots of the retention of Cr(VI) as a function of activation temperature for the samples from Example 7.
Figure 15:
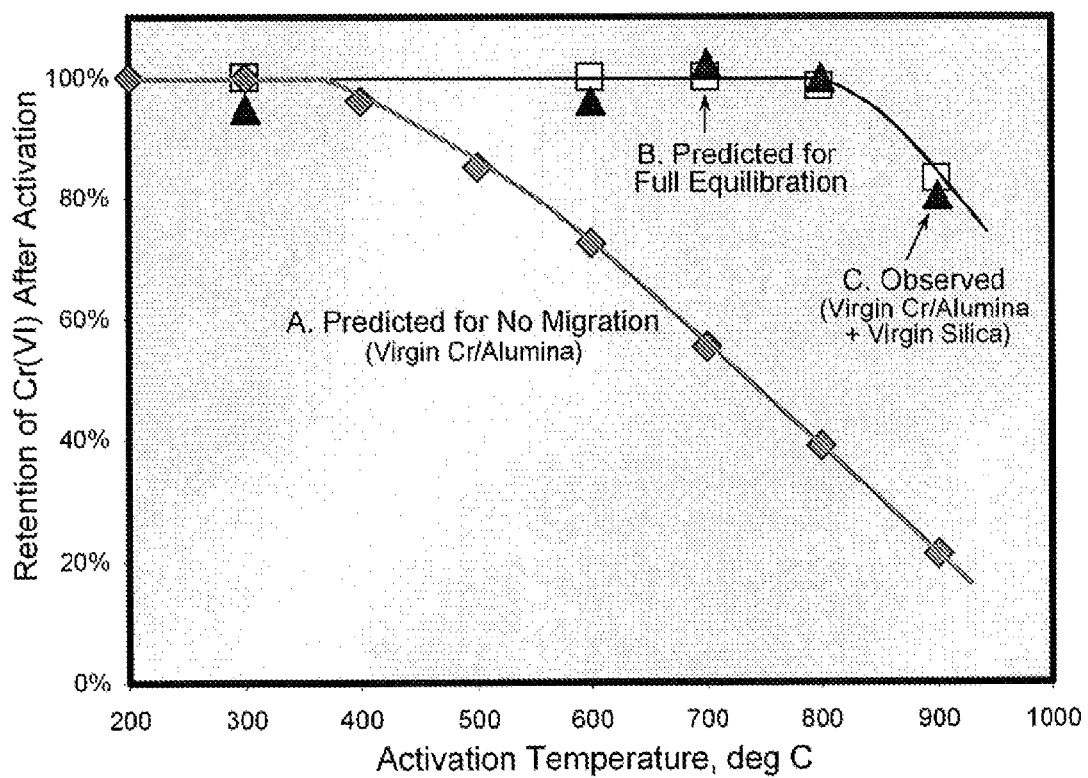

First, migration between virgin silica and virgin alumina was investigated. Both combinations, virgin Cr/silica and virgin alumina as well as virgin Cr/alumina and virgin silica, were investigated. Chromium could also be transferred during co-activation from silica to alumina and vice versa. FIG. 14 shows the results of an experiment in which virgin Cr/silica was mixed with virgin alumina in a 1:3 ratio, then co-activated in oxygen at various temperatures for 24 hours as described above. Transfer from silica to alumina seemed to be very similar to that from silica to silica in FIG. 5 (Example 3). A high degree of mobility was observed at the lowest temperature tested, 400° C. By 900° C. transfer had reached about 60% of full equilibration. Migration in the reverse direction seemed to occur even more willingly. FIG. 15 plots the results of an experiment in which virgin Cr/alumina was mixed with virgin silica in a 1:3 ratio, then co-activated as before. This was the only case found in which the transfer reached full equilibrium.

Figure 16:
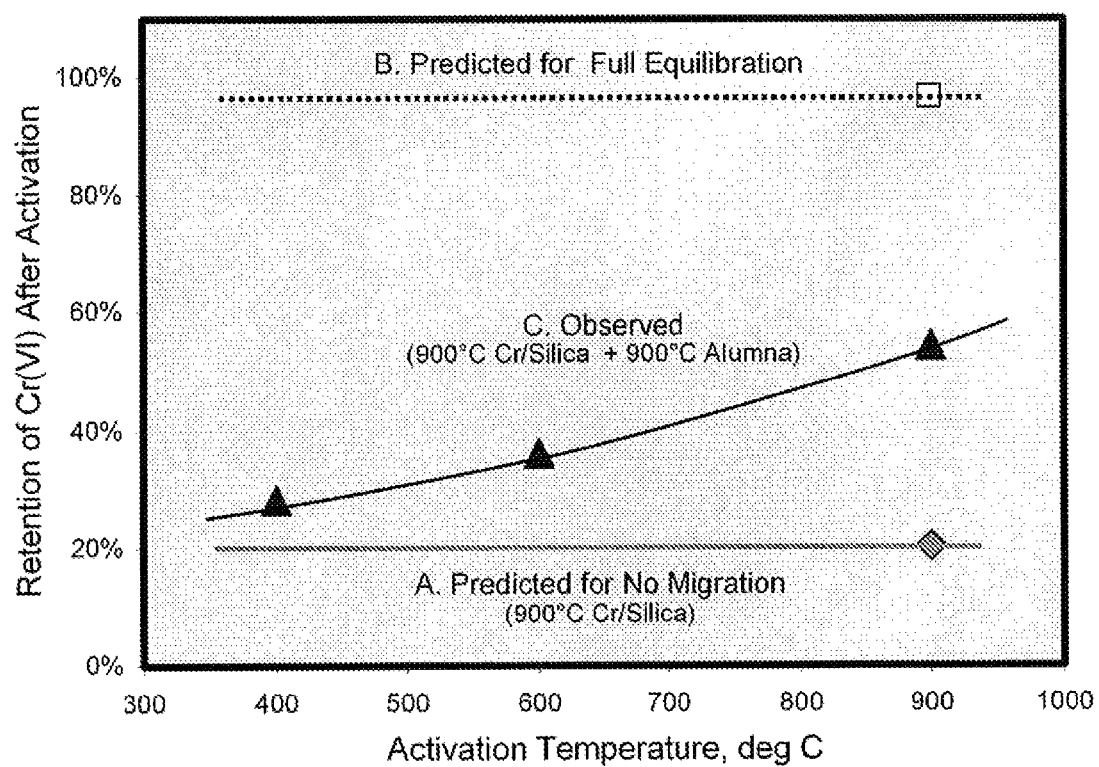
Figure 17:
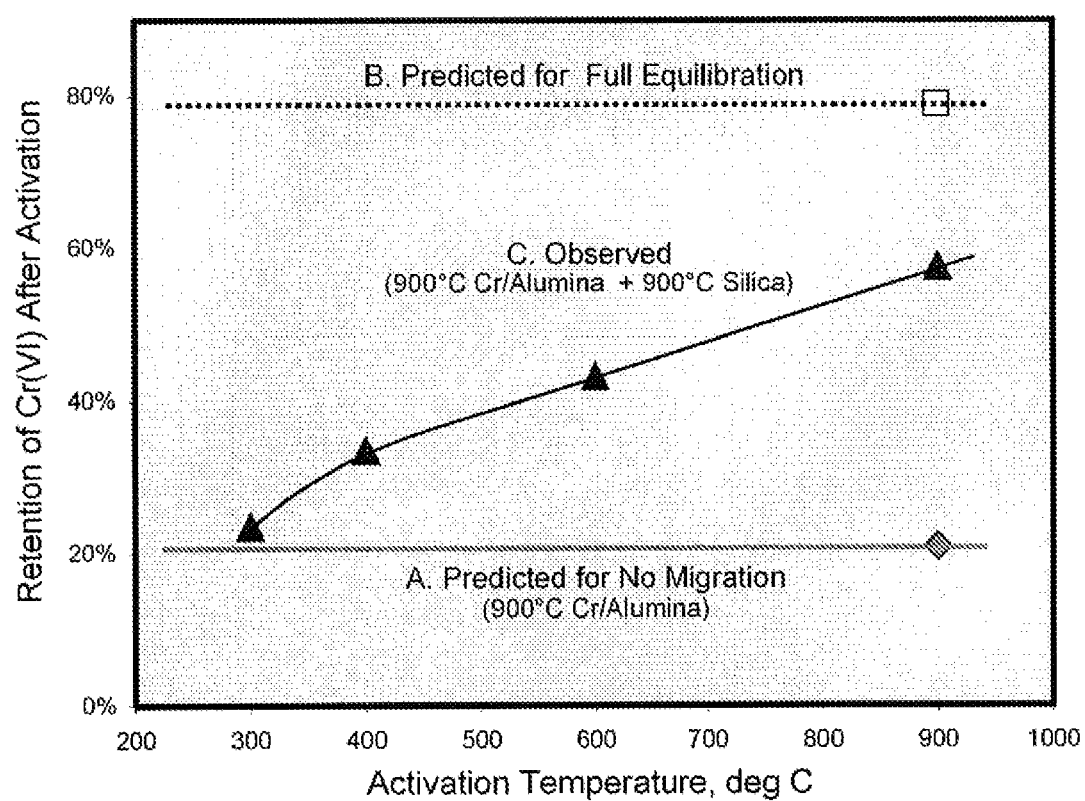

Secondly, migration between calcined silica and calcined alumina was investigated. Transfer was also possible from calcined silica to calcined alumina. FIG. 16 plots the results obtained when Cr/silica, previously calcined at 900° C., was co-activated with three parts of alumina, also previously and individually calcined at 900° C. The transfer behavior was again very similar to two calcined silicas, shown above in FIG. 5 (Example 3). Little or no migration was observed after co-activation at 400° C. Slightly more was observed at 600° C., and significantly more at 900° C., where 44% of full equilibration was reached. Transfer in the opposite direction again seemed to occur a little more willingly. FIG. 17 plots the results obtained from co-activation of 900° C. Cr/alumina with three parts of 900° C. silica. The pattern is very similar except that in this case 63% of equilibration was achieved at 900° C.

Figure 18:
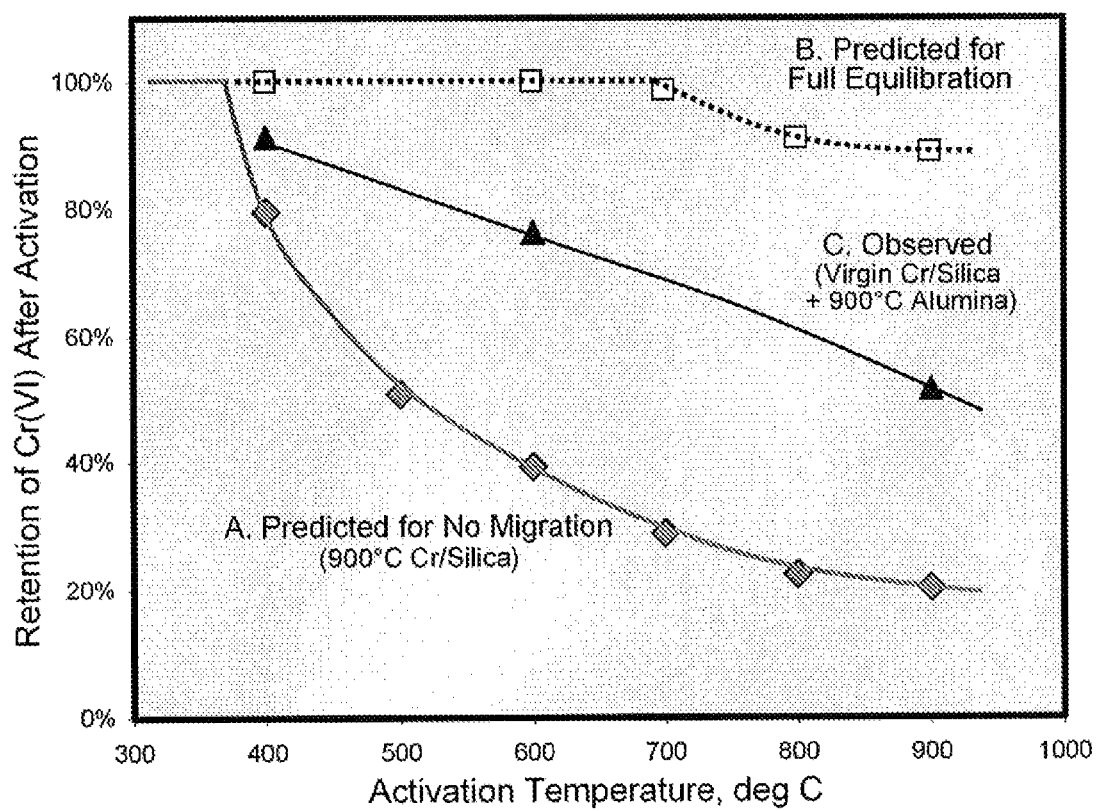
Figure 19:
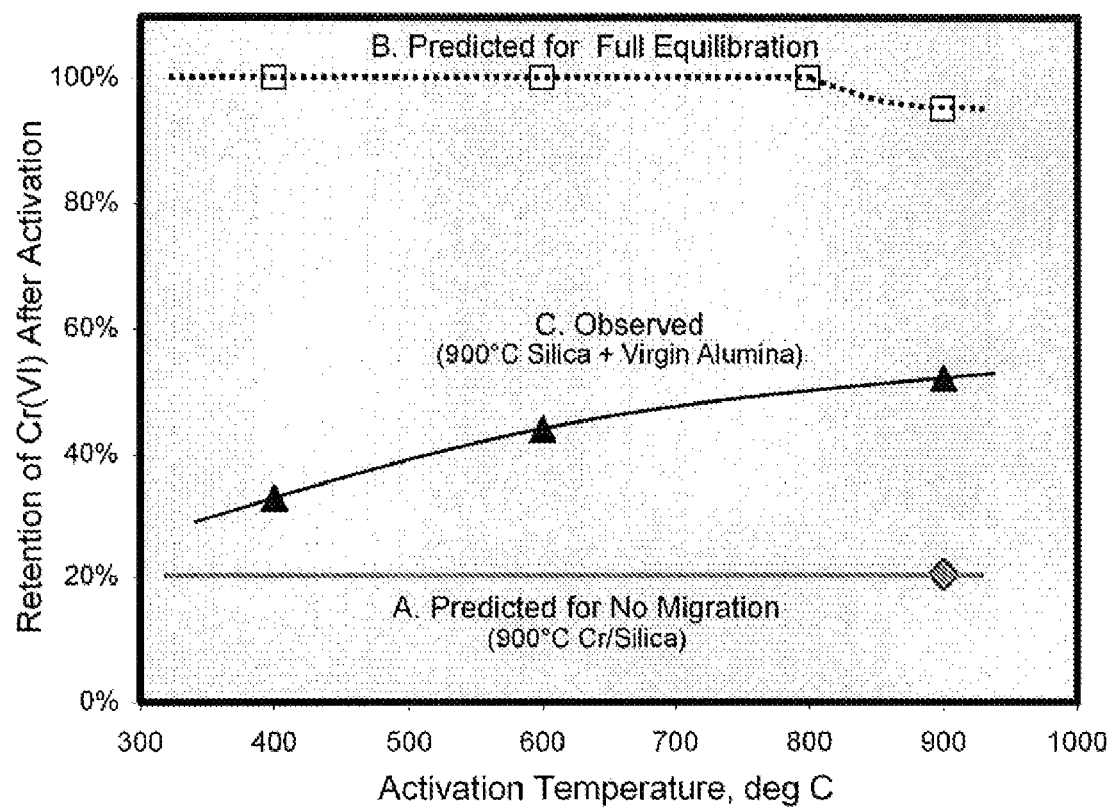

Finally, migration between silica to alumina, one of which was calcined was investigated. Both alternatives, virgin Cr/Silica and calcined alumina as well as calcined Cr/silica and virgin alumina, were investigated. Finally two other experiments were also performed in which Cr was transferred from silica to alumina. In FIG. 18 virgin Cr/silica was co-activated with alumina that had already been calcined at 900° C. Migration was observed at the lowest temperature tested, 400° C., and by 900° C. it had reached half the equilibrium value. In FIG. 19 Cr/silica, previously calcined at 900° C., was co-activated with virgin alumina. Little transfer occurred at 400° C., more at 600° C., and at 900° C. about 46% of the equilibrium value was reached.

Example 8

For comparison between a fixed and fluidized bed, several experiments were carried out with the silica and Cr/silica components from Example 2 having an average particle size of 50-100 μm. In this experiment the reaction vessel used for fluidization 100 is illustrated in FIG. 20. Referring to FIG. 20, reaction vessel 100 comprised an activator tube 105 with a top port 110, a bottom port 115, and a support porous disk 120. 10 cm of white virgin silica 125 was placed on the porous disk support 120. The virgin silica 125 was then covered with about 1 cm of a catalyst layer 130 comprising green Cr/silica that had been commercially activated at 900° C. The catalyst layer 130 was then covered with a second 10 cm layer of virgin silica 135 such that the catalyst layer 130 was sandwiched between two virgin silica layers 125 and 135. For a fixed bed experiment, air entered from the top port 110 and exited from the bottom port 115. For a fluidized bed experiment, air entered from the bottom port 115 and exited from the top port 110. The temperature was raised at 150° C./hr to 900° C. where it was held for 24 hours.

When the experiment started there was a sharp demarcation between the layers. Since the Cr/silica in the catalyst layer 130 had a dark green color, the boundary was easy to see visually. It was expected that migration would cause a blurring of the layer boundaries, up and down, as Cr gradients formed due to macroscopic movement of Cr into the silica layers. However, after the experiment was concluded the boundary demarcations were found to be very sharp. A yellow transition band of only about 0.5 to 1 mm was seen at the interface of the two layers. This suggests that there is considerable resistance to Cr flow. Without wishing to be limited by theory, a particle of Cr/silica at the boundary does lose some fraction of its Cr into its immediate contact sphere of silica particles. Those recipient particles in turn then pass on an even smaller fraction of their Cr to their sphere of contacted particles. Thus, a sharp gradient develops in a short distance and the drive for bulk flow is lost. In contrast, a fluidized bed continually exposes each Cr/silica particle to a well mixed representative sample of the un-promoted silica particle population.

Another type of fixed bed experiment was also carried out. A reaction vessel similar to that illustrated in FIG. 20 was utilized. The samples were a 50/50 mixture of the same virgin silica and green 900° C. commercial Cr/silica. In this case, the two components were allowed to fluidize for an hour at room temperature to ensure homogeneous mixing by reversing the air flow inlet and outlet stream as described above. Then the air flow was reversed again to create a fixed bed of already mixed components. Activation was carried out again at 900° C. with air flow from the top to prevent particle movement. Reoxidation of the Cr(III) occurred quickly in this environment, indicating movement of the Cr. When the tube had been at 900° C. for only 1 hour, it was cooled and examined. The bed had already changed from green to orange-beige, indicating a very fast migration in the fixed bed. After 5 hours at 900° C. the sample had turned completely orange. The Cr(VI) values obtained are listed in Table 3, where it can be seen that after 5 hours about 95% of the had become hexavalent. The success of Cr transfer in this second fixed bed experiment, compared to the failure of Cr transfer in the first fixed bed experiment, again suggests a very limited transfer distance. That is, Cr probably transfers (in this time frame) from a Cr/silica particle to a shell of surrounding particles that are only few particles deep. When the bed is already well mixed, this is not a handicap.

TABLE 3

Comparison of Cr transfer in fixed versus fluid bed.

| First Component | Second Component | Co-Activation* at 900° C. | Fixed Bed Results | | Fluid Bed Results | |
|---|---|---|---|---|---|---|
| | | | % Cr(VI) | Conversion to Cr(VI) | % Cr(VI) | Conversion to Cr(VI) |
| 850° C. Cr/Silica | None | None | 0.525 | 58% | 0.526 | 58% |
| 850° C. Cr/Silica | Virgin Silica* | 1 hr | 0.341 | 81% | 0.352 | 80% |
| 850° C. Cr/Silica | Virgin Silica* | 5 hr | 0.401 | 95% | 0.417 | 94% |

*Co-activation in same dry air flow. Cr/silica to silica blend ratios, fixed bed: 1.14 to 1, fluid bed: 1.03 to 1.

A third experiment was conducted using a fluidized bed similar to that illustrated in FIG. 20 to investigate chromium mobility. For comparison, a similar 50/50 experiment described above was utilized. Air flow and temperatures used were unchanged. After 1 hour at 900° C. the fluidized bed had also taken on an orange-beige color, and was almost indistinguishable from the fixed bed catalyst. After 5 hours it had also turned orange. The Cr(VI) values are listed in Table 3, and are almost indistinguishable between the two beds. Thus the two modes of activation, fixed and fluidized bed, seemed to be similarly effective, at least in this experiment.

Example 9

This example demonstrates the migration of Cr in a commercial setting to provide a more efficient utilization of the available Cr. A commercial catalyst sold by Inneos as FP30X (Sample 9A) was charged to a commercial activator. The activator was a 42 inch diameter vessel equipped with PROCEDYNE distributor plate. 600 lbs of sample 9A was charged, and this charge was calcined in dry air fluidization gas moving through the vessel as described above at a flow rate of 0.25 ft/s. The activation temperature was ramped up to 1575° F. at a rate of 2.5° F. per minute. It was then held at 1575° F. for 12 hours, and then cooled to near ambient temperature before discharge and sampling. This normal activation was found to have a Cr(VI) concentration of 0.3865 wt %. Thus, of the 1% total Cr present, only about 39% was converted to Cr(VI).

In a second activation, the same vessel was charged with 300 lbs of EP30X and 300 lbs of silica that had similar porosity as EP30X but lacking the chromium. The combined 600 lbs of catalyst and silica mixture (Sample 9B) was then activated under identical conditions as described previously. The Cr((VI) content was found to be 0.3938 wt %. This result demonstrates that about 79% of the total Cr present was converted to Cr(VI) due to the migration of inactive Cr(III) from the EP30X to form active Cr(VI) on the accompanying silica.

Both samples 9A and 9B were then tested for polymerization activity. Sample 9A produced activities of 1500-2000 lb/lb/h while sample 9B produced similar activities of 1600-2100 lb/lb/h. The similarity in polymerization activities for both samples is another signal that the Cr transferred were to become active on the silica, otherwise the activity of sample 9B should have been about half of the activity of sample 9A. Both samples 9A and 9B produced comparable melt index values of 0.85 to 0.90 and HLMI vales of 50 to 55. Thus sample 9B suffered no loss in activity or melt index potential even though it contained only half the total Cr. This indicates a more efficient use of the Cr to form Cr(VI).

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method comprising:
    contacting a donor support with a recipient support to generate a mixture; and
    heating the mixture to produce a polymerization catalyst, wherein a metal or a metal-containing compound migrates from the donor support to the recipient support.

2. The method of claim 1 wherein the donor support, the recipient support, or both comprise silica, alumina, silica-titania, aluminophosphate, zirconia, titania, or combinations thereof.

3. The method of claim 1 wherein the donor support and the recipient support comprise silica.

4. The method of claim 1 wherein the donor support is formed via contact with a chromium-containing compound.

5. The method of claim 4 wherein the chromium-containing compound is a water-soluble compound.

6. The method of claim 4 wherein the chromium-containing compound is a hydrocarbon-soluble compound.

7. The method of claim 1 wherein the donor support has not been heated to equal to or greater than 200° C. prior to contact with the recipient support.

8. The method of claim 1 wherein the donor support has been heated to equal to or greater than 200° C. prior to contact with the recipient support.

9. The method of claim 1 wherein the donor support has a surface area in the range of from about 10 m$^2$/g to about 1000 m$^2$/g.

10. The method of claim 1 wherein the donor support comprises equal to or greater than 50% silica.

11. The method of claim 1 wherein the donor support comprises from about 0.0001% to about 15% chromium by final weight of the donor support.

12. The method of claim 1 wherein the recipient support does not contain an effective amount of a polymerization catalytic compound.

13. The method of claim 1 wherein the recipient support has not been heated to equal to or greater than 200° C. prior to contact with the donor support.

14. The method of claim 1 wherein the recipient support contains a partial amount of a polymerization active compound than that of an otherwise otherwise similar recipient support containing fully saturated amount of the polymerization active compound.

15. The method of claim 1 wherein the recipient support has a surface area in a range of from about 10 m$^2$/g to about 1000 m$^2$/g.

16. The method of claim 1 wherein the recipient support is a virgin support.

17. The method of claim 1 wherein the donor support and recipient support are contacted at a ratio of from about 100:1 to 1:100.

18. The method of claim 1 wherein the contacting occurs via dry mixing of the donor support and the recipient support.

19. The method of claim 1 wherein the contacting occurs in a fixed bed or fluidized bed.

20. The method of claim 1 wherein the heating of the mixture is in a range of from about 400° C. to about 1000° C.

21. A method comprising:
   contacting a donor support comprising inactive metal species with a recipient support; and
   mobilizing the inactive metal species from the donor support to form an active metal species on the recipient support.

22. The method of claim 21 wherein the donor support and the recipient support comprise silica.

23. The method of claim 21 wherein the inactive metal species is Cr(III) and the active metal species is Cr(VI).

* * * * *